(12) United States Patent
Kuppuswamy et al.

(10) Patent No.: US 11,516,721 B1
(45) Date of Patent: Nov. 29, 2022

(54) EXTENDED ANTENNA-CARRIER ALLOCATION POLICY FOR SIMPLIFIED SWITCHING

(71) Applicant: QUALCOMM Incorporated, San Diego, CA (US)

(72) Inventors: Kalyan Kuppuswamy, San Diego, CA (US); Abhishek Saurabh Sachidanand Sinha, Malmö (SE); Orod Raeesi, Uusimaa (FI)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/374,770

(22) Filed: Jul. 13, 2021

(51) Int. Cl.
*H04W 40/02* (2009.01)

(52) U.S. Cl.
CPC .................................. *H04W 40/02* (2013.01)

(58) Field of Classification Search
None
See application file for complete search history.

(56) References Cited

U.S. PATENT DOCUMENTS

| | | | |
|---|---|---|---|
| 2021/0120531 A1 | 4/2021 | Jeon et al. | |
| 2021/0126760 A1 | 4/2021 | Lee et al. | |
| 2022/0014326 A1* | 1/2022 | Lourdu Raja | H04W 76/11 |
| 2022/0210808 A1* | 6/2022 | Rama Chandran | H04W 72/1273 |
| 2022/0232419 A1* | 7/2022 | Osterling | H04L 45/24 |

FOREIGN PATENT DOCUMENTS

EP 3996325 A1 * 5/2022 ............ H04L 47/24

OTHER PUBLICATIONS

Yajima, Anil Umesh Tatsuro et al. "Overview of O-RAN Fronthaul Specifications." NTT DOCOMO Technical Journal vol. 21 No. 1 (Jul. 2019) (Year: 2019).*
International Search Report and Written Opinion—PCT/US2022/033941—ISA/EPO—dated Oct. 7, 2022 (20 pages).
O-RAN Fronthaul Working Group 4: "Control, User and Synchronization Plane Specification", ORAN-WG4. CUS.0.v02.00; Internet Citation, Aug. 2, 2019 (Aug. 2, 2019), pp. 1-218, XP009527536, Retrieved from the Internet: URL: https://www.o-ran.org/specification-access, [pp. 37-41, 94].

* cited by examiner

*Primary Examiner* — Brian S Roberts
(74) *Attorney, Agent, or Firm* — Procopio, Cory, Hargreaves & Savitch LLP

(57) ABSTRACT

Apparatus, methods, and computer-readable media for facilitating simplified switching at an RU are disclosed herein. An example method for wireless communication at an RU includes transmitting, to a DU, capability information indicating support of endpoint groups, each endpoint group associated with a respective set of RU endpoints. The example method also includes receiving an eAxC message from the DU based on the capability information, the eAxC message including a DU port identifier, a band sector identifier, a component carrier identifier, and an RU port identifier. The example method also includes using a first portion of the RU port identifier to identify an endpoint group, the respective set of RU endpoints of the endpoint group associated with a set of characteristics. Additionally, the example method includes using a second portion of the RU port identifier to index the eAxC message to an RU endpoint of the endpoint group.

30 Claims, 18 Drawing Sheets

# EXTENDED ANTENNA-CARRIER ALLOCATION POLICY FOR SIMPLIFIED SWITCHING

TECHNICAL FIELD

The present disclosure relates generally to communication systems, and more particularly, to communication utilizing an open radio access network (O-RAN).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a radio unit (RU). An example apparatus may transmit, to a distributed unit (DU), capability information indicating support of endpoint groups, each endpoint group associated with a respective set of RU endpoints. The example apparatus may also receive an extended Antenna-Carrier (eAxC) message from the DU based on the capability information, the eAxC message including a DU port identifier, a band sector identifier, a component carrier identifier, and an RU port identifier. Additionally, the example apparatus may use a first portion of the RU port identifier to identify an endpoint group, the respective set of RU endpoints of the endpoint group associated with a set of characteristics. The example apparatus may also use a second portion of the RU port identifier to index the eAxC message to an RU endpoint of the endpoint group.

In another aspect of the disclosure, a method, a computer-readable medium, and an apparatus are provided for wireless communication at an RU. An example apparatus may transmit, to a DU, capability information indicating support of endpoint groups, each endpoint group associated with a respective set of RU endpoints. The example apparatus may also receive an eAxC message from the DU, the eAxC message including a group index based on the capability information. Additionally, the example apparatus may route the eAxC message to a processing component based in part on the group index included in the eAxC message.

In another aspect of the disclosure, a method, a computer-readable medium, and an apparatus are provided for wireless communication at a DU. An example apparatus may receive, from an RU, capability information indicating support of endpoint groups by the RU, each endpoint group associated with a respective set of RU endpoints. The example apparatus may also encode, based on the capability information, an endpoint group associated with an eAxC message using a first portion of an RU port identifier, the eAxC message including a DU port identifier, a band sector identifier, a component carrier identifier, and the RU port identifier. Additionally, the example apparatus may encode an RU endpoint of the endpoint group using a second portion of the RU port identifier. The example apparatus may also transmit the eAxC message to the RU.

In another aspect of the disclosure, a method, a computer-readable medium, and an apparatus are provided for wireless communication at a DU. An example apparatus may receive, from an RU, capability information indicating support of endpoint groups by the RU, each endpoint group associated with a respective set of RU endpoints. The example apparatus may also allocate eAxC messages to RU endpoints within respective endpoint groups based in part on the capability information. Additionally, the example apparatus may transmit an eAxC message to the RU, the eAxC message including a group index associated with an endpoint group.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
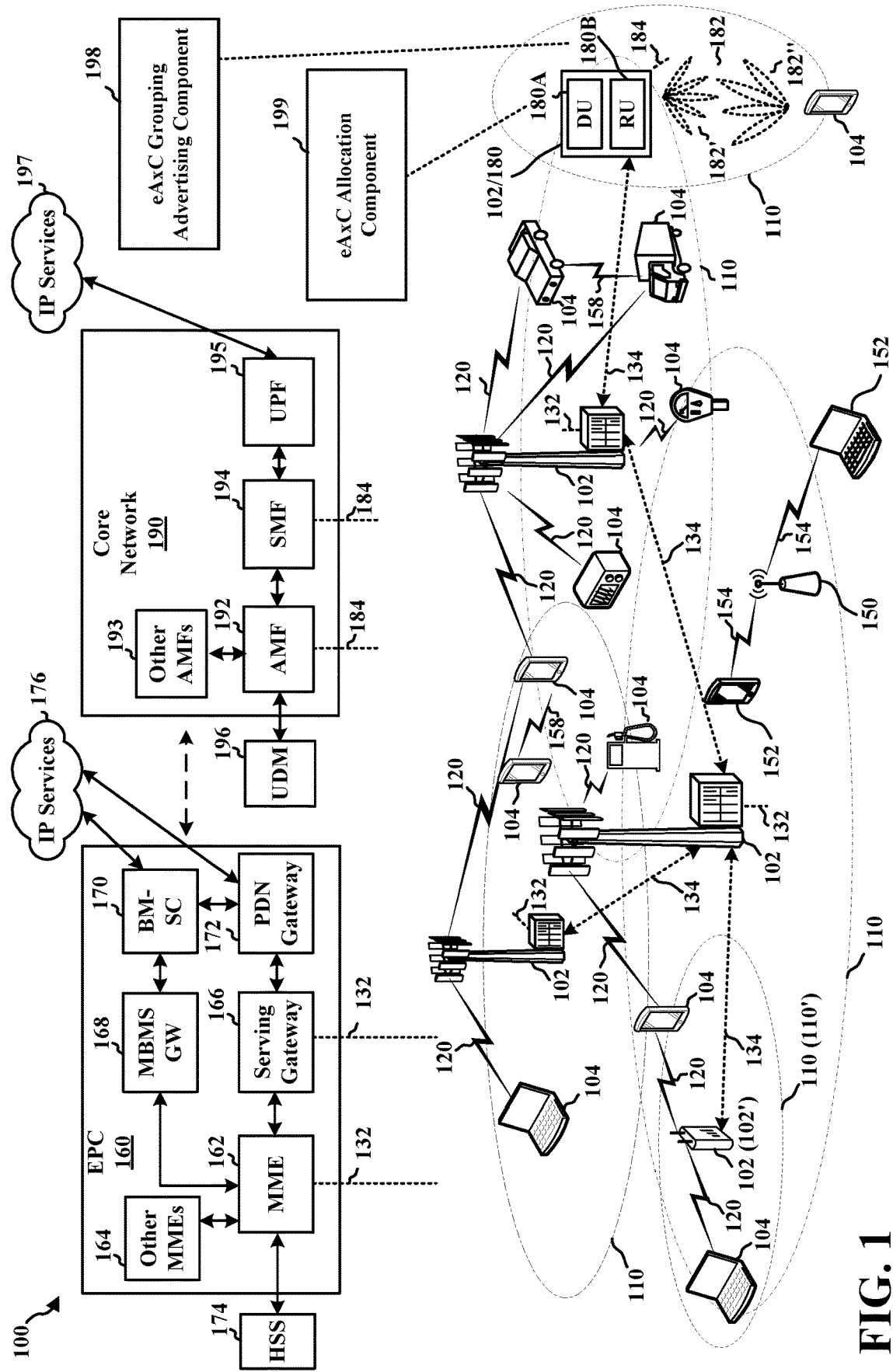
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

Aspects disclosed herein provide techniques for simplifying the routing of messages to the correct hardware component for processing (also referred to as "switching"). Disclosed techniques may configure an RU to determine the groups of endpoints in a transmission direction (e.g., uplink or downlink). The RU may then indicate to which group a receive endpoint ("rx-endpoint") or a transmit endpoint ("tx-endpoint") belongs. For example, the RU may advertise, via transmitting capability information to the DU, to which group a tx-endpoint or an rx-endpoint belongs. That is, for each endpoint (e.g., which may be referred generally to as a "Mx-endpoint"), the RU may indicate to which group the endpoint belongs. In some examples, the endpoints may be indicated via a respective "static-low-level-tx-endpoint" parameter or a "static-low-level-rx-endpoint" parameter.

Additionally, aspects disclosed herein configure the RU to receive an eAxC message (e.g., a message including an eAxC) and perform switching based on the RU port identifier of the eAxC message. For example, the DU may encode the RU port identifier to include a group index and a per-group layer index or a per-group stream index (referred to herein as a "per-group layer/stream index"). The group index may indicate a group and the per-group layer/stream index may indicate the RU endpoint. The RU may decode the group index and then route the eAxC message to the correct hardware component for processing based on the group index. By using a first portion and a second portion of an RU port identifier to index the eAxC message, aspects disclosed herein facilitate hierarchical addressing of RU endpoints of the RU.

FIG. 1 is a diagram illustrating an example of a wireless communications system and an access network 100 including base stations 102 and 180 and UEs 104.

The access network 100 may include an open radio access network (O-RAN) to provide a standardization of radio interfaces to procure interoperability between component radio equipment. A base station 180 may be an O-RAN base station, and the base station 180 may include a DU 180A and an RU 180B, based on a lower layer functional split. The O-RAN may include an open fronthaul (FH) interface between the DU 180A and the RU 180B.

In certain aspects, the RU 180B, may be configured to manage one or more aspects of wireless communication by indicating support of endpoint groupings. For example, the RU 180B may include an eAxC grouping advertising component 198 configured to transmit, to a DU, capability information indicating support of endpoint groups, each endpoint group associated with a respective set of RU endpoints. The example eAxC grouping advertising component 198 may also be configured to receive an eAxC message from the DU based on the capability information, the eAxC message including a DU port identifier, a band sector identifier, a component carrier identifier, and an RU port identifier. Additionally, the example eAxC grouping advertising component 198 may be configured to use a first portion of the RU port identifier to identify an endpoint group, the respective set of RU endpoints of the endpoint group associated with a set of characteristics. The example eAxC grouping advertising component 198 may also be configured to use a second portion of the RU port identifier to index the eAxC message to an RU endpoint of the endpoint group.

In another configuration, the eAxC grouping advertising component 198 may be configured to transmit, to a DU, capability information indicating support of endpoint groups, each endpoint group associated with a respective set of RU endpoints. The example eAxC grouping advertising component 198 may also be configured to receive an eAxC message from the DU, the eAxC message including a group index based on the capability information. The example eAxC grouping advertising component 198 may also be configured to route the eAxC message to a processing component based in part on the group index included in the eAxC message.

In another configuration, the DU 180A, may be configured to manage or more aspects of wireless communication by allocating eAxC endpoints based on the capabilities of the RU. For example, the DU 180A may include an eAxC allocation component 199 configured to receive, from an RU, capability information indicating support of endpoint groups by the RU, each endpoint group associated with a respective set of RU endpoints. The example eAxC allocation component 199 may also be configured to encode, based on the capability information, an endpoint group associated with an eAxC message using a first portion of an RU port identifier, the eAxC message including a DU port identifier, a band sector identifier, a component carrier identifier, and the RU port identifier. Additionally, the example eAxC allocation component 199 may be configured to encode an RU endpoint of the endpoint group using a second portion of the RU port identifier. The example eAxC allocation component 199 may also be configured to transmit the eAxC message to the RU In another configuration, the eAxC allocation component 199 may be configured to receive, from an RU, capability information indicating support of endpoint groups by the RU, each endpoint group associated with a respective set of RU endpoints. The example eAxC allocation component 199 may also be configured to allocate eAxC messages to RU endpoints within respective endpoint groups based in part on the capability information. Additionally, the example eAxC allocation component may be configured to transmit an eAxC message to the RU, the eAxC message including a group index associated with an endpoint group.

The aspects presented herein may enable improving RU ingress routing, for example, by simplifying switching based on an eAxC allocation policy and/or reducing costs associated with lookup table sizes and lookup table processing.

Although the following description provides examples directed to 5G NR (and, in particular, to O-RAN employing 5G NR), the concepts described herein may be applicable to other similar areas, such as LTE, LTE-A, CDMA, GSM, and/or other wireless technologies, in which the RAN may be configured via an open RAN.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
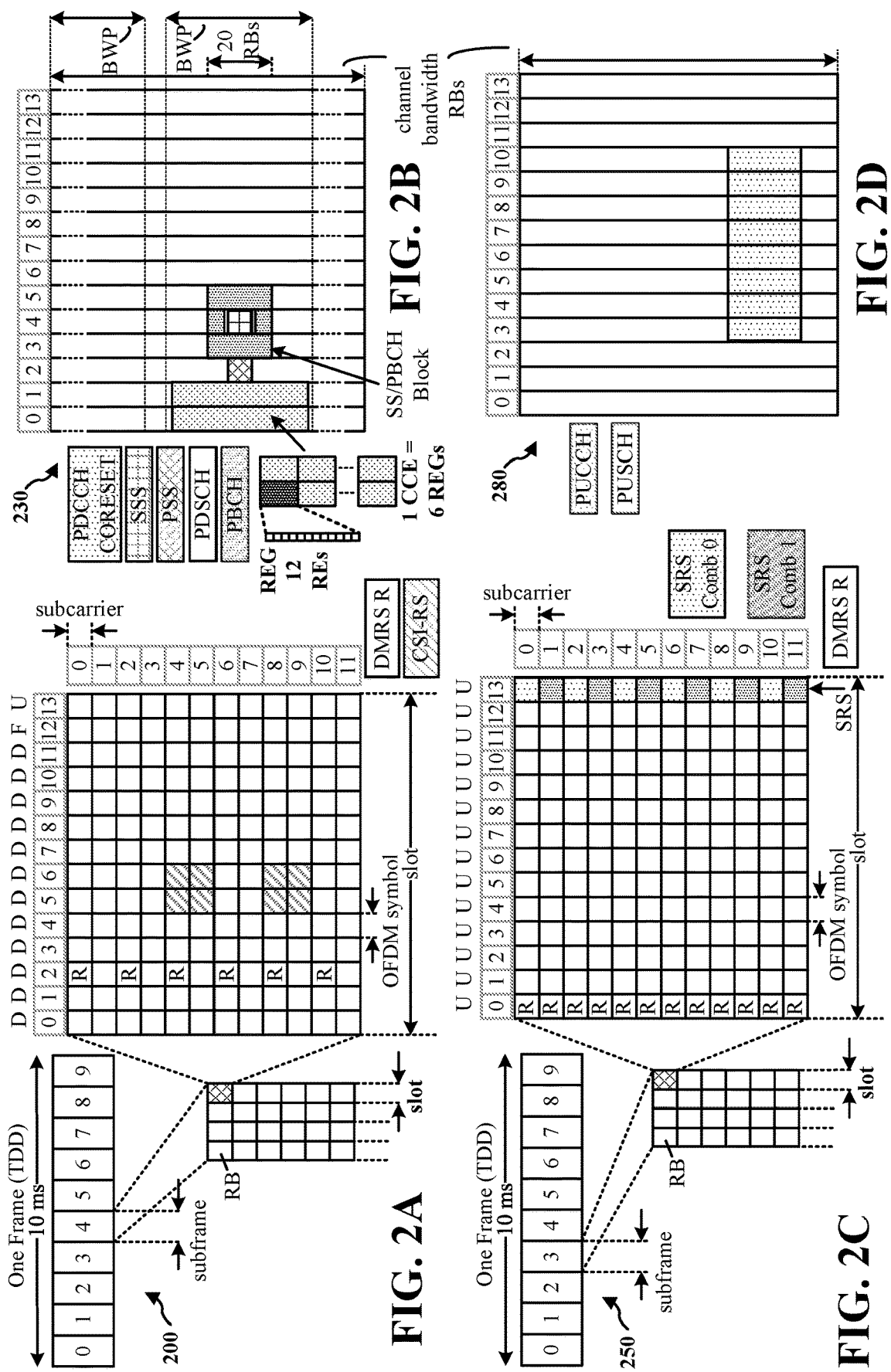
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
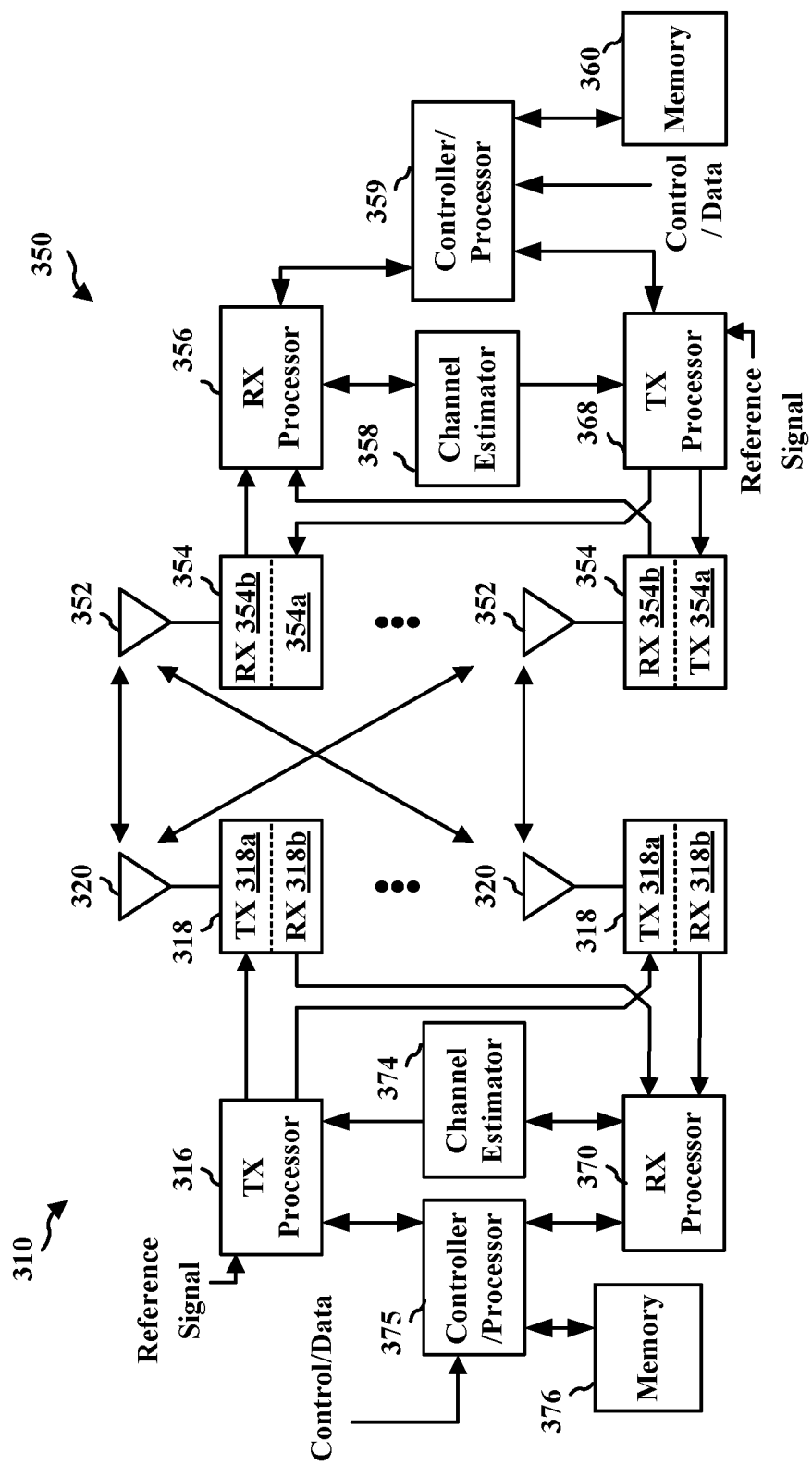
FIG. 3 is a diagram illustrating an example of a base station and a user equipment (UE) in an access network.

FIG. 3 is a block diagram that illustrates an example of a first wireless device that is configured to exchange wireless communication with a second wireless device. In the illustrated example, the first wireless device may comprise a base station 310, the second wireless device may comprise a UE 350, and the base station 310 may be in communication with the UE 350 in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with the eAxC grouping advertising component 198 and/or the eAxC allocation component 199 of FIG. 1.

To establish a connection in a network, a UE first connects to a radio access network (RAN). The RAN communicates directly with users and acts as a gateway between a UE and a network core, such as the core network 190 of FIG. 1. The RAN may comprise a base station, such as the base station 180 of FIG. 1, including a baseband unit (BBU) and radio equipment (RE). The BBU and the RE together may perform digital signal processing functions related to a protocol stack.

In some examples, the network may employ an O-RAN to provide a standardization of radio interfaces to procure interoperability between component radio equipment. For example, in an O-RAN, the RAN may be disaggregated into a centralized unit (CU), a distributed unit (DU), and a radio unit (RU). The RU (sometimes referred to herein as an "O-RU") may facilitate transmitting, receiving, amplifying, and/or digitizing radio frequency (RF) signals. The RU may be located at, near, or integrated with, an antenna. The DU and the CU provide computational functions and may facilitate the transmission of digitized radio signals within the network. The DU (sometimes referred to herein as an "O-DU") may be physically located at or near the RU. The CU (sometimes referred to herein as an "O-CU") may be located near the core network.

The DU may provide downlink and uplink baseband processing, a supply system synchronization clock, signal processing, and an interface with the CU. The RU may provide downlink baseband signal conversion to an RF signal, and uplink RF signal conversion to a baseband signal. The O-RAN may include an open fronthaul (FH) interface between the DU and the RU.

Lower layer functions of the protocol stack may be split between the DU and the RU. In a first example split, RF functions, such as signal sampling and baseband uplink/downlink conversion, are performed by the RU. Such a split allows for a relatively simple and cost-effective RU and the DU performs most of the baseband processing. However, such a split also places strict latency limits on the FH, for example, to satisfy timing-sensitive protocols, such as HARQ. In a second example split, DU and RU functionalities may be split between the RLC layer and the PDCP layer. In such a split, timing-sensitive protocols (such as HARQ) may be moved from the DU to the RU, along with MAC layer functions and PHY layer functions. Such a split may allow latency limits on the FH to be relaxed. However, such a split may also increase the complexity of the RU.

In a third example split, the RU may perform digital beamforming functions, CP addition/removal functions, and FFT functions, while the DU may perform higher layer functions starting from resource element (RE) mapping/demapping. Such a split, also referred to as a "7.2x split," results in data being transmitted over the FH to include in-phase and quadrature (I-Q) samples. The example 7.2x split may accommodate suitable data transfer speeds between the DU and the RU to facilitate time-sensitive protocols, while also balancing the processing workloads at the DU and the RU.

In some examples, the FH between the DU and the RU may be implemented via a fiber connection. The FH interface may include a control/user/synchronization (C/U/S) plane and a management (M) plane.

The C-plane is a control plane that may refer specifically to real-time control between the DU and the RU. The U-plane is a user plane that may refer to IQ sample data transferred between the DU and the RU. The S-plane is a synchronization plane that may refer to traffic between the RU or the DU to the synchronization controller. The M-plane is a management plane that may refer to management operations sharing the configuration management between the DU and the RU.

On boot-up of the network system, a set of configuration management messages may be exchanged on the M-plane between the DU and the RU. The DU and the RU may configure the M-plane accordingly and use the configuration for the C/U/S-plane communication.

After the network system boot-up, the M-plane configuration may be dynamically changed through remote procedure call (RPC) messages. For example, the DU and the RU may dynamically change the M-plane configuration with get-config and edit-config RPCs. In some aspects, the DU and the RU may exchange a protocol, such as a NETCONF protocol, using the RPC messages. The RPC messages may dynamically change the M-plane configuration between the DU and the RU.

Messages exchanged between the DU and the RU may use extended Antenna-Carrier (eAxC) identifiers as message source and message destination identifiers. The eAxC identifier may be included in a header portion of a message. As used herein, an "eAxC message" may generally refer to a message exchanged between the DU and the RU that includes an eAxC identifier, such as a C-plane message or a U-plane message.

Figure 4:
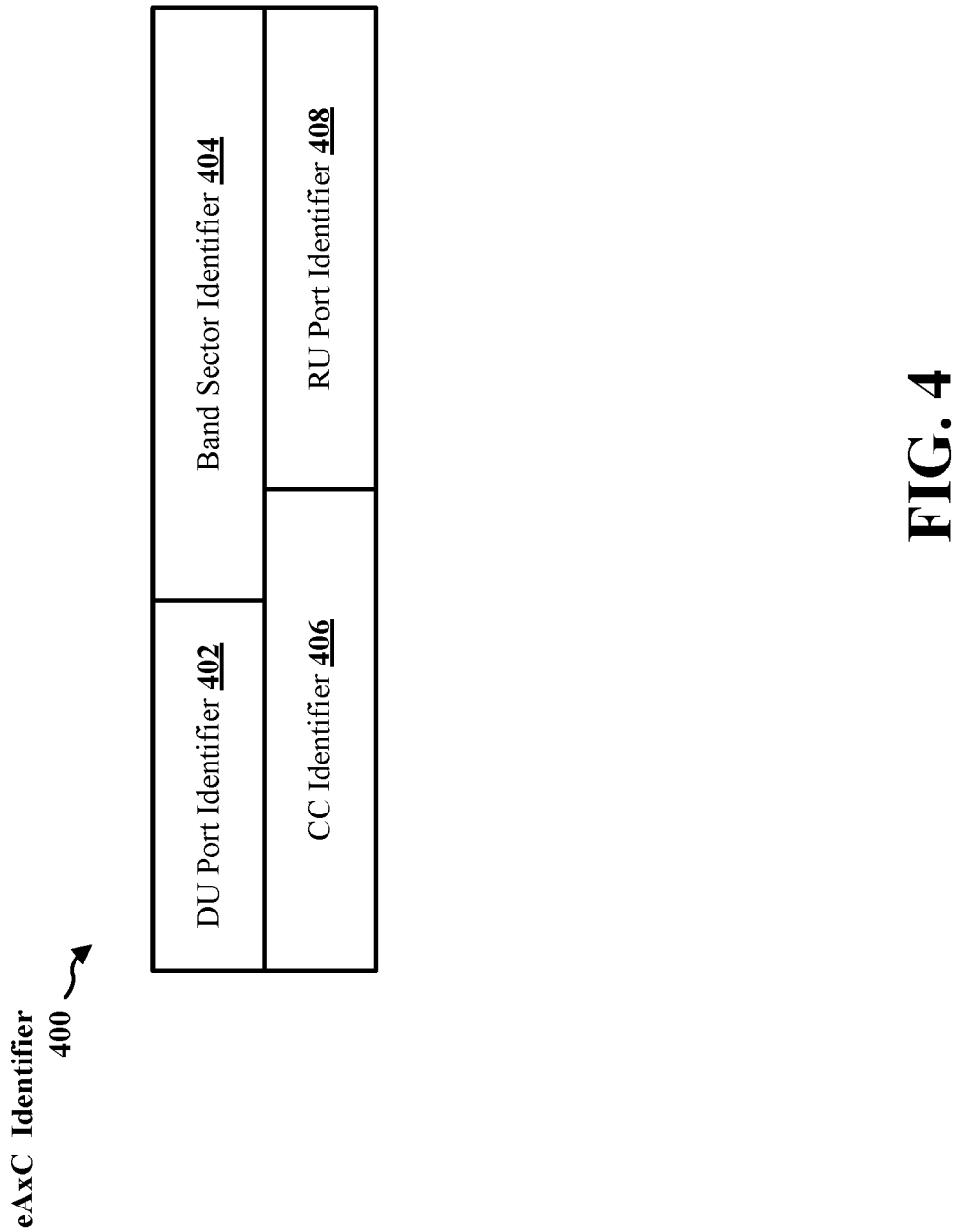
FIG. 4 is a diagram illustrating an example extended Antenna-Carrier (eAxC) identifier.

FIG. 4 is a diagram illustrating an example eAxC identifier 400. The example eAxC identifier 400 may be used to facilitate communication in an O-RAN. In the example of FIG. 4, the eAxC identifier 400 includes a DU port identifier 402 ("DU Port ID"), a band sector identifier 404 ("Band-Sector_ID"), a component carrier (CC) identifier 406 ("CC_ID"), and an RU port identifier 408 ("RU_Port_ID").

Figure 5:
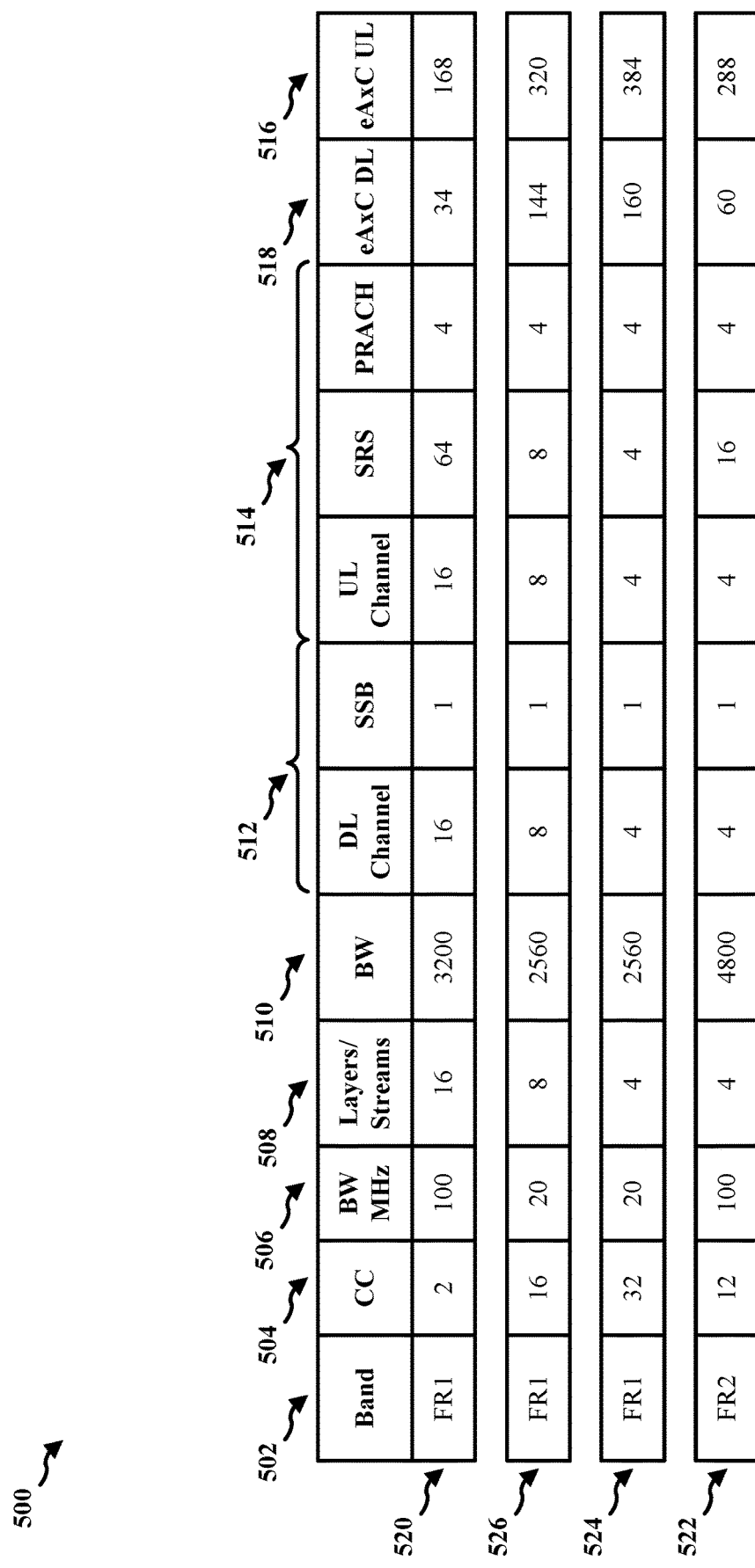
FIG. 5 is a diagram illustrating example eAxC allocations for a DU.

FIG. 5 is a diagram illustrating example eAxC allocations 500 for a DU, such as the example DU 180A of FIG. 1. The eAxC allocations 500 may facilitate communication an O-RAN. The example eAxC allocations 500 include different component carrier/bandwidth/layer combinations. For example, a configuration (also referred to as an "M-plane configuration") may indicate a frequency range 502 ("Band"), a quantity of component carriers 504 ("CC"), a bandwidth allocation 506 associated with each component carrier ("BW MHz"), and a quantity of layers/streams 508 ("Layers/Streams"). The CC 504, the bandwidth allocation 506, and the quantity of layers/streams 508 may be used to determine a total layer/stream bandwidth allocation 510 ("BW").

In the example of FIG. 5, a configuration also indicts downlink groups 512 and uplink groups 514. As shown in FIG. 5, the downlink groups 512 includes a quantity of downlink channel endpoints ("DL Channel") (PDSCH) and a quantity of SSB endpoints ("SSB"). The uplink groups 514 includes a quantity of uplink channel endpoints ("UL Channel") (PUSCH), a quantity of SRS endpoints ("SRS"), and a quantity of physical random access channel (PRACH) endpoints ("PRACH"). In the example of FIG. 5, the downlink groups 512 and the uplink groups 514 are indicated per component carrier. The example eAxC allocations 500 also include a quantity of downlink eAxC allocations 516 ("eAxC DL") and a quantity of uplink eAxC allocations 518 ("eAxC UL"). The quantity of downlink eAxC allocations 516 and the quantity of uplink eAxC allocations 518 are based on the quantity of component carriers 504 and the quantities indicated in the respective downlink groups 512 and uplink groups 514.

For example, the eAxC allocations 500 include a first configuration 520 indicating an FR1 band, two component carriers, a bandwidth of 100 MHz, and 16 layers/streams, which results in a layer/stream bandwidth allocation of 3200 MHz (2*100 MHz*16=3200 MHz). The first configuration 520 also indicates a quantity of 34 downlink eAxC allocations 516 based on the two component carriers, the 16 downlink channel endpoints, and the one SSB endpoint (e.g., 2*(16+1)=34). The first configuration 520 also indicates a quantity of 168 uplink eAxC allocations 518 based on the two component carriers, the 16 uplink channel endpoints, the 64 SRS endpoints, and the four PRACH endpoints (e.g., 2*(16+64+4)=168).

Although the above description includes two example groups in the downlink direction (e.g., the downlink channel group and the SSB group) and three example groups in the uplink direction (e.g., the uplink channel group, the SRS group, and the PRACH group), other examples may include additional or alternative groups associated with a direction.

As shown in FIG. 5, it may be possible for the quantity of uplink eAxC allocations 518 and/or the quantity of downlink eAxC allocations 516 to be large. Moreover, when the RU receives a message, such as a control plane message, the RU may determine the hardware component to route the message to for processing. For example, in the uplink direction, the RU may receive control plane messages related to the uplink channel (PUSCH), to the SRS, or to the PRACH. In the downlink direction, the RU may receive control plane messages related to the downlink channel or to the SSB. Based on the direction and type of message, the RU may route the message to an appropriate hardware component for processing. For example, the RU may route PUSCH control plane messages to a first hardware component for processing, may route SRS control plane messages to a second hardware component for processing, may route PRACH control plane messages to a third hardware component for processing, may route PDSCH control plane messages to a fourth hardware component for processing, and may route SSB control plane messages to a fifth hardware component for processing.

It may be appreciated that two or more of the hardware components may be a same hardware component that applies different processing techniques for processing the respective control plane messages. For example, the RU may route PUSCH control plane messages, SRS control plane messages, and PRACH control plane messages to a first hardware component that applies different techniques for processing PUSCH control plane messages, SRS control plane messages, and PRACH control plane messages. The RU may also route PDSCH control plane messages and SSB control plane messages to a second hardware component that applies different techniques for processing PDSCH control plane messages and SSB control plane messages. In another example, the RU may route PRACH control plane messages to a first hardware component, may route PUSCH control plane messages and PDSCH control plane messages to a second hardware component, and may route SRS control plane messages and SSB control plane messages to a third hardware component. The second hardware component may be configured to apply different techniques for processing PUSCH control plane messages and PDSCH control plane messages. The third hardware component may be configured to apply different techniques for processing SRS control plane messages and SSB control plane messages. However, other examples may include additional or alternate combinations for routing messages to hardware components.

Aspects disclosed herein provide techniques for simplifying the routing of messages to the correct hardware component for processing. Disclosed techniques may configure the RU to determine the groups of endpoints in a transmission direction (e.g., uplink or downlink). For example, in the uplink direction, the RU may determine an uplink channel (PUSCH) group, an SRS group, and a PRACH group. In the downlink direction, the RU may determine a downlink channel group and an SSB group. The RU may then indicate to which group a receive endpoint ("rx-endpoint") or a transmit endpoint ("tx-endpoint") belongs. For example, the RU may advertise, via transmitting capability information to the DU, to which group a tx-endpoint or a rx-endpoint belongs. That is, for each endpoint (e.g., which may be referred generally to as a "Mx-endpoint"), the RU indicates to which group the endpoint belongs. In some examples, the endpoints may be indicated via a respective "static-low-level-tx-endpoint" parameter or a "static-low-level-rx-endpoint" parameter.

For example, the RU may determine that there are 85 rx-endpoints that may be grouped into three rx-endpoint groups A, B, and C. The RU may advertise that group A includes 50 rx-endpoints, group B includes 25 rx-endpoints, and group C includes 10 rx-endpoints. That is, for reach of the 85 rx-endpoints, the RU may indicate a group (e.g., group A, group B, or group C) to which the respective rx-endpoint belongs.

The DU may receive the advertised endpoint groupings and perform an eAxC identifier ("eAxCID") allocation. The eAxCID allocation may include allocating an RU port allocation, such as allocating an RU port identifier for each eAxCID.

Aspects disclosed herein configure the RU to receive an eAxC message (e.g., a message including an eAxC identifier, such as the example eAxC identifier 400 of FIG. 4) and perform switching based on the RU port identifier of the eAxC message. For example, the DU may encode a first portion of the RU port identifier to include a group index and may encode a second portion of the RU port identifier to include a per-group layer/stream index. The group index may indicate an endpoint group (e.g., the uplink channel group, the SRS group, or the PRACH group in the uplink direction, and the downlink channel group or the SRS group in the downlink direction) and the per-group layer/stream index may indicate an RU endpoint. The RU may decode the RU port identifier and use the first portion of the RU port identifier to determine an endpoint group. The RU may then use the second portion of the RU port identifier to determine an RU endpoint and route the eAxC message to the correct hardware component for processing based on the per-group layer/stream index.

As described above, the DU may allocate an RU port allocation for each eAxCID allocation. The DU may apply an encoding technique to the RU port identifier to indicate an endpoint group and an endpoint group layer/stream. In some examples, the encoding technique may include dedicated bits to the group index and to the per-group layer/stream index to indicate the respective endpoint group and group layer/stream (or RU endpoint). In some examples, the DU may apply an encoding technique including a bitmask to indicate the endpoint group.

Figure 6:
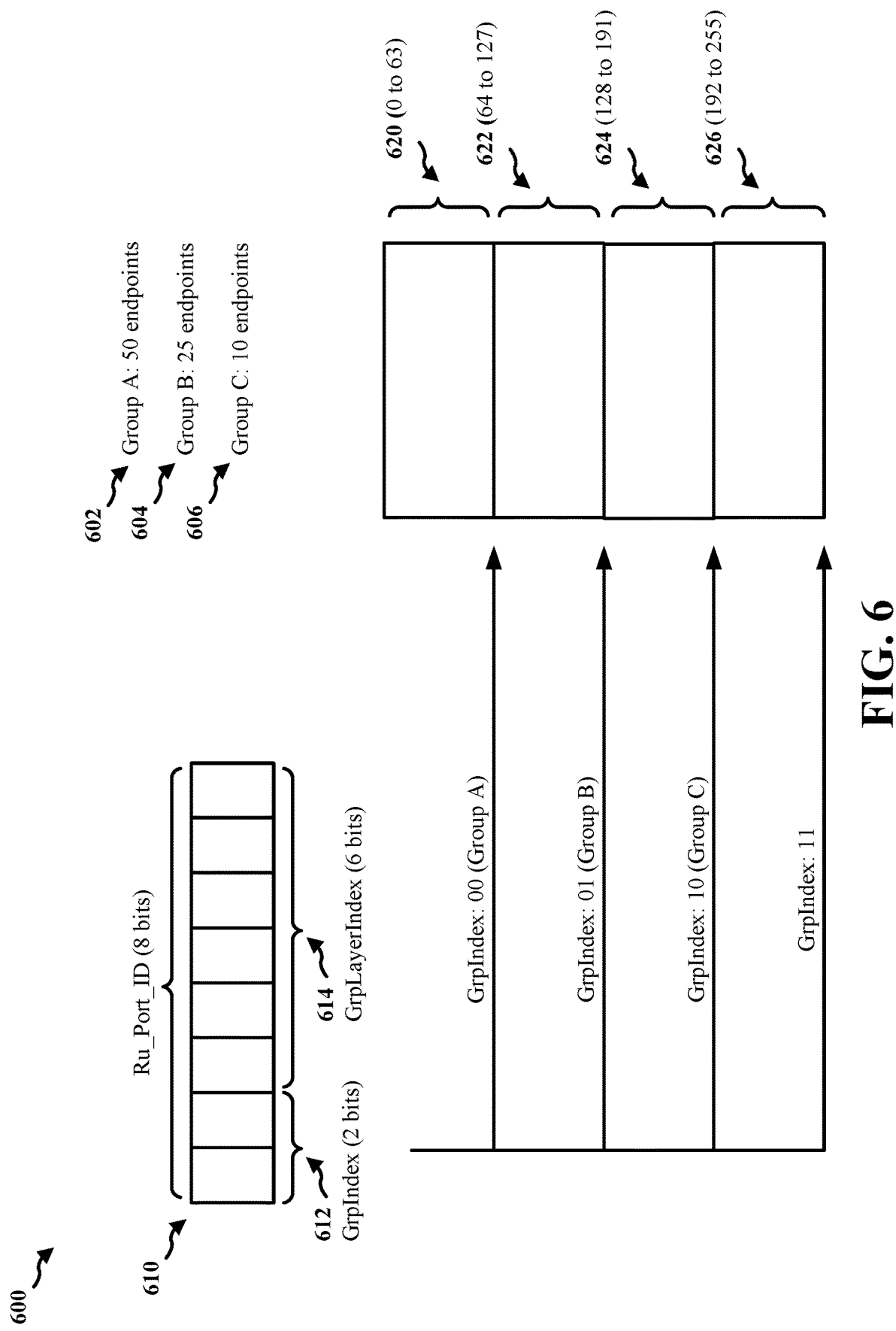
FIG. 6 is a diagram illustrating an example allocation policy for grouping RU endpoints.

FIG. 6 is a diagram 600 illustrating an example allocation policy for grouping RU endpoints, as presented herein. For example, a DU may receive capability information from an RU indicating a quantity of groups and a quantity of endpoints associated with each of the respective groups. The illustrated example of FIG. 6 includes three example groups 602, 604, 606 (e.g., a group A, a group B, and a group C) including respective quantities of RU endpoints. As shown in FIG. 6, the first group 602 includes 50 endpoints, the second group 604 includes 25 endpoints, and the third group 606 includes 10 endpoints. In the illustrated example, the RU endpoints are associated with RU receiver endpoints ("rx-endpoints").

In the example of FIG. 6, the DU applies an encoding technique including dedicated bits to the group index and to the per-group layer/stream index. The DU may determine the quantity of bits to dedicate to the group index based on the quantity of groups. For example, the DU may determine to dedicate two bits of an RU port identifier to the group index based on the three groups 602, 604, 606 of FIG. 6.

The DU may determine the quantity of bits to dedicate to the per-group layer/stream index based on the quantity of endpoints associated with each group. For example, with respect to the first group 602 (e.g., group A), the DU may allocate six bits to represent the 50 endpoints. In a similar manner, the DU may determine to allocate five bits to represent the 25 endpoints associated with the second group 604 (e.g., group B), and may determine to allocate four bits to represent the 10 endpoints associated with the third group 606 (e.g., group C).

In the example of FIG. 6, the DU may use the maximum number of bits allocated to a group for representing the endpoints of each group. For example, based on the six bits allocated to represent the 50 endpoints associated with the first group 602), the DU may determine to allocate two bits to indicate the group index and six bits to indicate the per-group layer/stream index. As shown in FIG. 6, an RU port identifier 610 includes eight bits including two bits dedicated to a group index 612 ("GrpIndex") and six bits dedicated to a per-group layer/stream index 614 ("GrpLayerIndex"). The two bits of the group index 612 may represent each of the three groups 602, 604, 606, and the six bits of the per-group layer/stream index 614 may represent each of the endpoints within any one group. Thus, the group index 612 and the per-group layer/stream index 614 are associated with respective static bit widths (or "length-in-bits").

In the example of FIG. 6, a first group index ("00") may correspond to the first group 602. The six bits of the per-group layer/stream index 614 may represent a first block 620 of 64 different group layers/streams, and 50 of the 64 different group layers/streams of the first block 620 may correspond to the 50 endpoints associated with the 50 endpoints of the first group 602. A second block 622 of 64 different group layers/streams may represent group layers/streams 64 to 127 associated with a second group index ("01"), and 25 of the 64 different group layers/streams of the second block 622 may correspond to the 25 endpoints associated with the 25 endpoints of the second group 604. A third block 624 may represent group layers/streams 128 to 191 associated with a third group index ("10"), and 10 of the 64 different group layers/streams endpoints of the third block 624 may correspond to the 10 endpoints associated with the 10 end points of the third group 606. As shown in FIG. 6, a fourth block 626 may represent group layers/streams 192 to 255 associated with a fourth group index ("11"). However, in the example of FIG. 6, none of the group layers/streams of the fourth block 626 may correspond to endpoints as 85 total endpoints across the three groups have already been allocated.

As shown, the example encoding technique of FIG. 6 includes dedicated bits for group indexing and dedicated bits for per per-group layer/stream indexing. Such an encoding technique provides for linear addressing across groups. For example, each of the groups 602, 604, 606 is associated with a group index (e.g., "00," "01," or "10"), each group index is associated with a block of 64 group layers/streams (e.g., blocks 620, 622, 624), and each group layer/stream of a block may be mapped to an endpoint associated with a respective group. Additionally, the example encoding technique of FIG. 6 allows for simpler switching at the RU as the RU can determine the hardware component to route a message based on the group index indicated by the RU port identifier of the eAxC message instead of processing the full RU port identifier or by trying to route the messages to the different hardware components to determine the correct hardware component for the message. For example, in the example of FIG. 6, the RU may use the two most significant bits (MSBs) of the RU port identifier 610 to determine where to route the eAxC message and route the eAxC message to the correct hardware component accordingly.

However, such an encoding technique, as shown in FIG. 6, may result in wasted group layers/streams as there are unused group layers/streams (e.g., group layers/streams that are unmapped to endpoints of a group). For example, while the third block 624 includes 64 group layers/streams, in the example of FIG. 6, only ten of the group layers/streams are allocated to an endpoint.

In the example of FIG. 6, the DU allocates eAxCIDs to each of the endpoints received in the capability information. For example, the DU allocates the 85 endpoints to 85 group layers/streams within the first three blocks 620, 622, 624. In some examples, the DU may determine to allocate a subset of the endpoints. For example, the DU may determine to allocate eAxCIDs to half of the endpoints of the first group 602. In such an example, the DU may allocate five bits to represent half of the endpoints (e.g., 25 endpoints) of the first group 602, may allocate five bits to represent the 25 endpoints of the second group 604, and may allocate four bits to represent the 10 endpoints of the third group 606. By allocating eAxCIDs to only half of the endpoints of the first group 602, the DU may reduce the size of the RU port identifier to seven total bits (e.g., two dedicated bits for the group index and five dedicated bits for the per-group layer/stream index). In such an example, the RU may still use the two MSBs of the RU port identifier to route messages.

Figure 7:
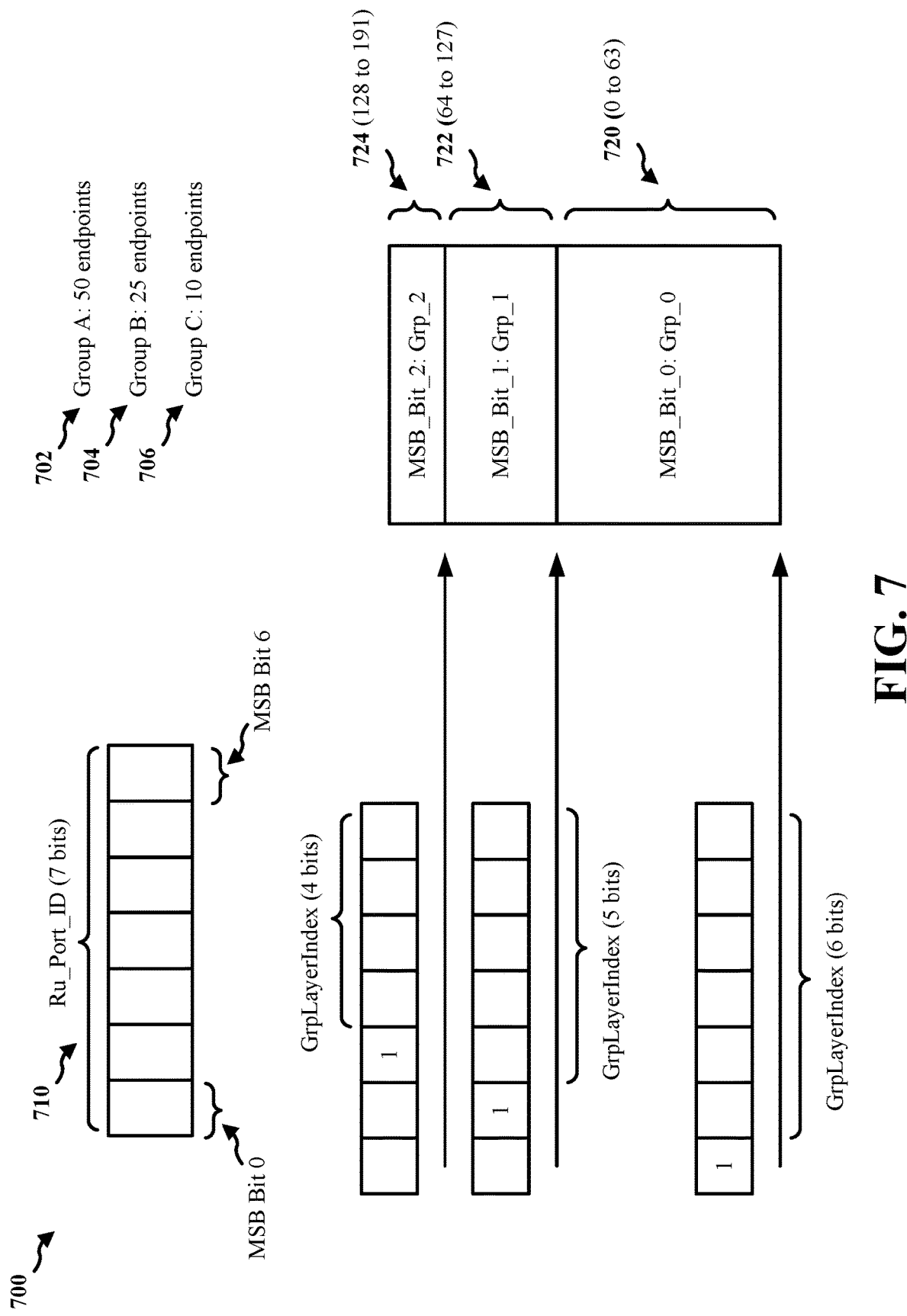
FIG. 7 is a diagram illustrating another example allocation policy for grouping RU endpoints.

FIG. 7 is a diagram 700 illustrating another example allocation policy for grouping RU endpoints, as presented herein. Similar to the example of FIG. 6, a DU may receive capability information from an RU indicating a quantity of groups and a quantity of endpoints associated with each of the respective groups. The illustrated example of FIG. 7 includes three example groups 702, 704, 706 (e.g., a group A, a group B, and a group C) including respective quantities of RU endpoints. As shown in FIG. 7, the first group 702 includes 50 endpoints, the second group 704 includes 25 endpoints, and the third group 706 includes 10 endpoints. In the illustrated example, the RU endpoints are associated with RU receiver endpoints ("rx-endpoints"). As described in connection with the example of FIG. 6, the 50 endpoints of the first group 702 may be represented by six bits, the 25 endpoints of the second group 704 may be represented by five bits, and the 10 endpoints of the third group 706 may be represented by four bits.

In the example of FIG. 7, the DU applies an encoding technique including a bitmask to indicate the endpoint group. For example, the location of a first value (e.g., a "1") of the MSB may be used to indicate a group and to distinguish from other groups. The bit width of the per-group layer/stream index may vary based on the bitmask.

For example, in FIG. 7, the endpoints associated with the first group 702 may be indicated by setting the MSB bit 0 ("MSB_Bit_0") of an RU port identifier 710 to the first value (e.g., "1"). Setting the MSB bit 0 to the first value may distinguish between group A endpoints and non-group A endpoints. The next six bits of the RU port identifier 710 (e.g., MSB bits 1 to 6) may be allocated to referencing the endpoints associated with the first group 702.

The endpoints associated with the second group 704 may be indicated by setting the MSB bit 0 to a second value (e.g., "0") and setting the next MSB ("MSB_Bit_1") to the first value (e.g., "1"). Setting the MSB bit 0 of the RU port identifier 710 to the second value (e.g., "0") may indicate that the corresponding eAxC message is not associated with the first group 702. However, when decoding the RU port identifier 710, the RU may determine that the corresponding eAxC message is associated with the second group 704 based on the next MSB ("MSB_Bit_1") being set to the first value (e.g., "1"). The remaining five bits of the RU port identifier 710 (e.g., MSB bits 2 to 6) may be allocated to reference the endpoints associated with the second group 704.

The endpoints associated with the third group 706 may be indicated by setting the MSB bit 0 and the MSB bit 1 to the second value (e.g., "0") and setting the MSB bit 2 ("MSB Bit 2") of the RU port identifier 710 to the first value (e.g., "1"). When decoding the RU port identifier 710, the RU may determine, based on the first two MSBs being set to the second value (e.g., "0"), that the corresponding eAxC message is not associated with the first group 702 and the second group 704. However, the RU may determine that the corresponding eAxC message is associated with the third group 706 based on the next MSB ("MSB Bit 2") being set to the first value (e.g., "1"). The remaining four bits of the RU port identifier 710 (e.g., MSB bits 3 to 6) may be allocated to reference the endpoints associated with the third group 706.

Compared to the encoding technique of FIG. 6, the encoding technique of FIG. 7 facilitates allocating eAxCIDs to each of the 85 endpoints using seven bits for the RU port identifier 710. However, the bit width (or size) of the bitmask associated with such an encoding technique varies based on the quantity of groups. Additionally, addressing across the groups is non-linear. For example, there are 64 group layers/streams associated with a first block 720 (e.g., group layers/streams 0 to 63) based on the six bits allocated to reference the endpoints associated with the first group 702, there are 32 group layers/streams associated with a second block 722 (e.g., group layers/streams 64 to 95) based on the five bits allocated to reference the endpoints associated with the second group 704, and there are 16 group layers/streams associated with a third block 724 (e.g., group layers/streams 96 to 111) based on the four bits allocated to reference the endpoints associated with the third group 706.

While the first example encoding technique (e.g., the dedicated bits (or static bit widths) of FIG. 6) and the second example encoding technique (e.g., the bitmask of FIG. 7) provide examples in which the second encoding technique results in a smaller RU port identifier (e.g., seven bits versus eight bits) based on an example of 85 endpoints, it may be appreciated that the second encoding technique may result in a smaller RU port identifier when applied to actual use cases. For example, referring to the example eAxC allocations 500, the first example configuration 520 includes three groups in the uplink direction (e.g., the uplink channel group, the SRS group, and the PRACH group). The first group (e.g., the uplink channel group) includes 16 endpoints, the second group (e.g., the SRS group) includes 64 endpoints, and the third group (e.g., the PRACH group) includes 4 endpoints. By applying the first encoding technique, the RU port identifier includes eight total bits including two dedicated bits to indicate one of the three groups and six dedicated bits to reference the largest quantity of endpoints associated with a group (e.g., the 64 endpoints associated with the SRS group).

In contrast, by applying the second encoding technique to the first example configuration 520, seven bits may be allocated to the RU port identifier. For example, to indicate the SRS endpoints, the MSB may be set to the first value (e.g., "1") to indicate the SRS group, and then six additional bits may be used to reference the 64 SRS endpoints, which results in seven bits to indicate the SRS group and respective endpoints. To indicate the uplink channel endpoints, the MSB may be set to the second value (e.g., "0"), the next MSB (e.g., MSB bit 1) may be set to the first value (e.g., "1") to indicate the uplink channel group, and then four bits may be used to reference the 16 uplink channel endpoints, which results in six bits to indicate the uplink channel group and respective endpoints. However, as seven bits are needed to indicate the SRS endpoints, it may be appreciated that five bits may be used to reference the 16 uplink channel endpoints so that the size of the RU port identifier remains constant at seven bits. To indicate the PRACH endpoints, the first two MSBs may be set to the second value (e.g., "0"), the next MSB (e.g., MSB bit 2) may be set to the first value (e.g., "1"), and then two additional bits may be used to reference the 4 PRACH endpoints, which results in five bits to indicate the PRACH group and respective endpoints. However, as seven bits are needed to indicate the SRS endpoints, it may be appreciated that four bits may be used to reference the 4 PRACH endpoints so that the size of the RU port identifier remains constant at seven bits.

Thus, referring to the first example configuration 520 of the eAxC allocations 500, applying the second encoding technique results in a smaller RU port identifier (e.g., seven bits) compared to when applying the first encoding technique (e.g., eight bits).

In another example, a second example configuration 522 of the eAxC allocations 500 includes three groups in the uplink direction (e.g., the uplink channel group, the SRS group, and the PRACH group). The first group (e.g., the uplink channel group) includes 4 endpoints, the second group (e.g., the SRS group) includes 16 endpoints, and the third group (e.g., the PRACH group) includes 4 endpoints. By applying the first encoding technique, the RU port identifier includes six total bits including two dedicated bits to indicate one of the three groups and four dedicated bits to reference the largest quantity of endpoints associated with a group (e.g., the 16 endpoints associated with the SRS group).

In contrast, by applying the second encoding technique to the second example configuration 522, five bits may be allocated to the RU port identifier. For example, to indicate the SRS endpoints, the MSB may be set to the first value (e.g., "1") to indicate the SRS group, and then four additional bits may be used to reference the 16 SRS endpoints, which results in five bits to indicate the SRS group and respective endpoints. To indicate the uplink channel endpoints, the MSB may be set to the second value (e.g., "0"), the next MSB (e.g., MSB bit 1) may be set to the first value (e.g., "1") to indicate the uplink channel group, and then two bits may be used to reference the 4 uplink channel endpoints, which results in four bits to indicate the uplink channel group and respective endpoints. However, as five bits are needed to indicate the SRS endpoints, it may be appreciated that three bits may be used to reference the 4 uplink channel endpoints so that the size of the RU port identifier remains constant at five bits. To indicate the PRACH endpoints, the first two MSBs may be set to the second value (e.g., "0"), the next MSB (e.g., MSB bit 2) may be set to the first value (e.g., "1"), and then two additional bits may be used to reference the 4 PRACH endpoints, which results in five bits to indicate the PRACH group and respective endpoints.

Thus, referring to the second example configuration 522 of the eAxC allocations 500, applying the second encoding technique results in a smaller RU port identifier (e.g., five bits) compared to when applying the first encoding technique (e.g., six bits).

In another example, referring again to the first example configuration 520, the downlink direction includes two groups (e.g., the downlink channel group and the SSB group). The first group (e.g., the downlink channel group) includes 16 endpoints and the second group (e.g., the SSB group) includes 1 endpoint. By applying the first encoding technique, the RU port identifier may be allocated five total bits including one dedicated bit to indicate one of the two groups and four dedicated bits to reference the largest quantity of endpoints associated with a group (e.g., the 16 endpoints associated with the downlink channel group).

By applying the second encoding technique to the first example configuration 520, the RU port identifier may also be indicated using five bits. For example, to indicate the downlink channel endpoints, the MSB may be set to the first value (e.g., "1") to indicate the downlink channel group, and then four additional bits may be used to reference the 16 endpoints of the downlink channel, which results in five bits to indicate the downlink channel group and respective endpoints. To indicate the SSB endpoint, the MSB may be set to the second value (e.g., "0"), the next MSB (e.g., MSB bit 1) may be set to the first value (e.g., "1") to indicate the SSB group, and then one bit may be used to reference the 1 SSB endpoint, which results in three bits to indicate the SSB group and respective endpoint. However, as five bits are needed to indicate the downlink channel endpoints, it may be appreciated that three bits may be used to reference the 1 SSB endpoint so that the size of the RU port identifier remains constant at five bits. To indicate the PRACH endpoints, the first two MSBs may be set to the second value (e.g., "0"), the next MSB (e.g., MSB bit 2) may be set to the first value (e.g., "1"), and then two additional bits may be used to reference the 4 PRACH endpoints, which results in five bits to indicate the PRACH group and respective endpoints.

Thus, referring to the downlink direction of the first example configuration 520 of the eAxC allocations 500, applying the first encoding technique and the second encoding technique results in an RU port identifier of a same bit width (e.g., five bits).

However, it may be appreciated that in some examples, it may be beneficial to use a static bit width for the encoding technique versus a bitmask. For example, a third example configuration 524 of the eAxC allocations 500 includes three groups in the uplink direction (e.g., the uplink channel group, the SRS group, and the PRACH group). The first group (e.g., the uplink channel group) includes 4 endpoints, the second group (e.g., the SRS group) includes 4 endpoints, and the third group (e.g., the PRACH group) includes 4 endpoints. By applying the first encoding technique, the RU port identifier may be allocated four total bits including two dedicated bits to indicate one of the three groups and two dedicated bits to reference the largest quantity of endpoints associated with a group (e.g., the four endpoints associated with the uplink channel group, the SRS group, or the PRACH group).

In contrast, by applying the second encoding technique to the third example configuration 524, five bits may be allocated to the RU port identifier. For example, to indicate the SRS endpoints, the MSB may be set to the first value (e.g., "1") to indicate the SRS group, and then two additional bits may be used to reference the 4 SRS endpoints, which results in three bits to indicate the SRS group and respective endpoints. To indicate the uplink channel endpoints, the MSB may be set to the second value (e.g., "0"), the next MSB (e.g., MSB bit 1) may be set to the first value (e.g., "1") to indicate the uplink channel group, and then two bits may be used to reference the 4 uplink channel endpoints, which results in four bits to indicate the uplink channel group and respective endpoints. To indicate the PRACH endpoints, the first two MSBs may be set to the second value (e.g., "0"), the next MSB (e.g., MSB bit 2) may be set to the first value (e.g., "1"), and then two additional bits may be used to reference the 4 PRACH endpoints, which results in five bits to indicate the PRACH group and respective endpoints. As the largest number of bits is five bits associated with the PRACH group in this example, it may be appreciated that four bits (e.g., two extra bits) may be used to represent the 4 SRS endpoints and three bits (e.g., one extra bit) may be used to represent the 4 uplink channel endpoints so that the size of the RU port identifier remains constant at five bits.

Thus, referring to the third example configuration 524 of the eAxC allocations 500, applying the first encoding technique results in a smaller RU port identifier (e.g., four bits) compared to when applying the second encoding technique (e.g., five bits).

In another example, a fourth example configuration 526 includes three groups in the uplink direction including 8 endpoints of the uplink channel group, 8 SRS endpoints, and 4 PRACH endpoints. By applying the first encoding technique, the RU port identifier may be allocated five total bits including two dedicated bits to indicate one of the three groups and three dedicated bits to reference the largest quantity of endpoints associated with a group (e.g., the 8 endpoints associated with the uplink channel group or the SRS group).

By applying the second encoding technique to the fourth example configuration 526, five bits may be allocated to the RU port identifier. For example, to indicate the endpoints of the uplink channel, the MSB may be set to the first value (e.g., "1") to indicate the uplink channel group, and then three additional bits may be used to reference the 8 endpoints of the uplink channel, which results in four bits to indicate the uplink channel group and respective endpoints. To indicate the SRS endpoints, the MSB may be set to the second value (e.g., "0"), the next MSB (e.g., MSB bit 1) may be set to the first value (e.g., "1") to indicate the SRS group, and then three bits may be used to reference the 8 SRS endpoints, which results in five bits to indicate the SRS group and respective endpoints. To indicate the PRACH endpoints, the first two MSBs may be set to the second value (e.g., "0"), the next MSB (e.g., MSB bit 2) may be set to the first value (e.g., "1") to indicate the PRACH group, and then two bits may be used to reference the four PRACH endpoints, which results in five bits to indicate the PRACH group and respective endpoints. As the largest number of bits is five bits associated with the SRS group and the PRACH group in this example, it may be appreciated that four bits (e.g., one extra bit) may be used to represent the 8 uplink channel endpoints so that the size of the RU port identifier remains constant at five bits.

Thus, referring to the uplink direction of the fourth example configuration 526 of the eAxC allocations 500, applying the first encoding technique and the second encoding technique results in an RU port identifier of a same size (e.g., five bits).

Figure 8:
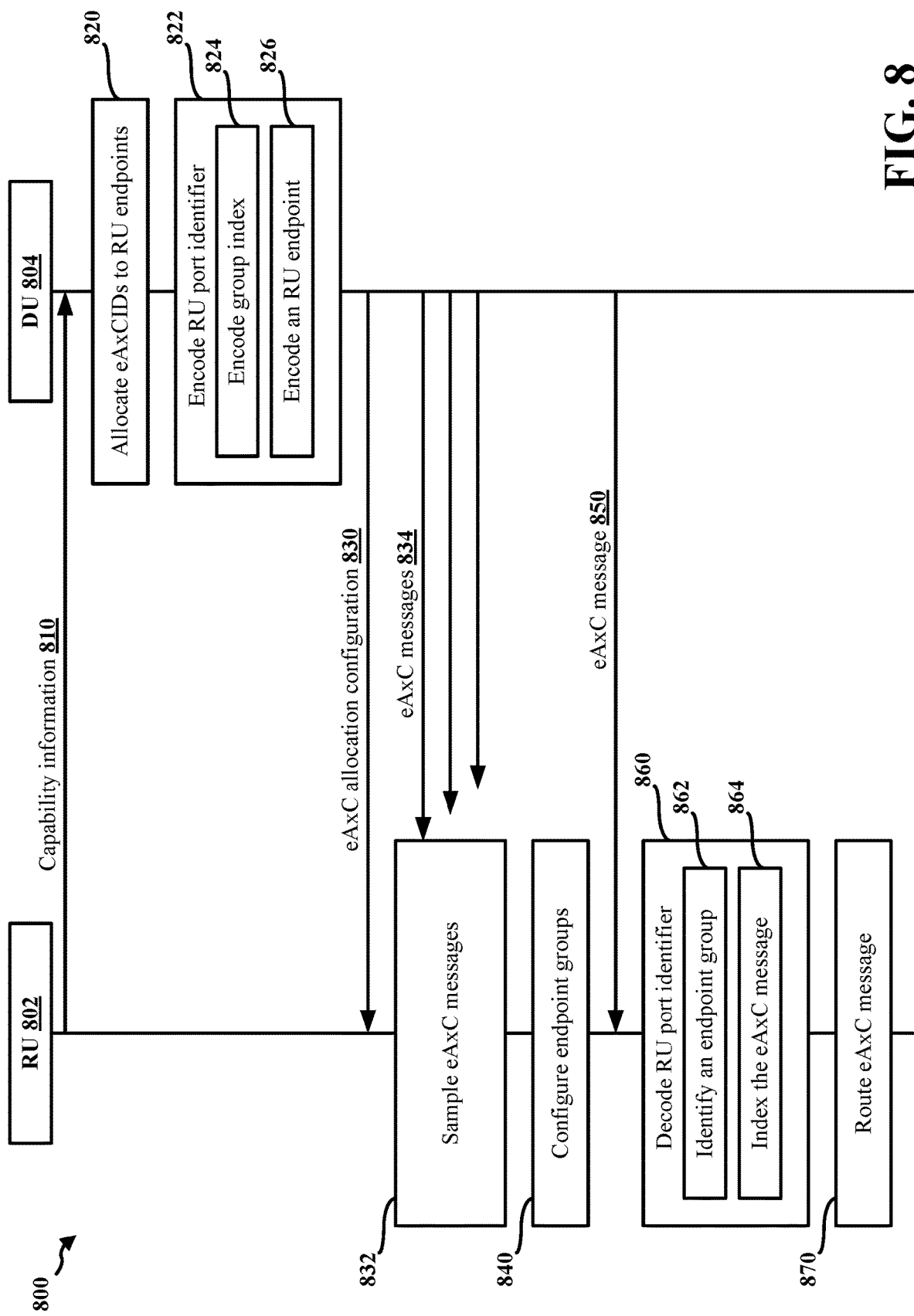
FIG. 8 is an example communication flow between an RU and an DU, in accordance with the teachings disclosed herein.

FIG. 8 illustrates an example communication flow 800 between an RU 802 and a DU 804, as presented herein. In the illustrated example, the communication flow 800 facilitates simplified switching at the RU based on an eAxC allocation policy. The RU 802 and the DU 804 may facilitate communication via an O-RAN. Aspects of the RU 802 may be implemented by the RU 180B of FIG. 1. Aspects of the DU 804 may be implemented by the DU 180A of FIG. 1. Although not shown in the illustrated example of FIG. 8, it may be appreciated that in additional or alternative examples, the RU 802 may be in communication with one or more UEs or other DUs, and/or the DU 804 may be in communication with one or more CUs or other RUs.

In the example of FIG. 8, the RU 802 transmits capability information 810 that is received by the DU 804. The RU 802 may transmit the capability information 810 via an M-plane message, a C-plane message, and/or a U-plane message. The capability information 810 may indicate a quantity of groups and a quantity of endpoints associated with each group. Referring to the examples of FIGS. 6 and/or 7, the capability information 810 may indicate that there are three groups and the quantity of endpoints associated with each group (e.g., 50 endpoints associated with a group A, 25 endpoints associated with a group B, and 10 endpoints associated with a group C).

In some examples, the capability information 810 may indicate the endpoints associated with each group. For example, the capability information 810 may indicate each RU transmit endpoint ("tx-endpoint") and the uplink direction groups (e.g., the uplink channel group, the SRS group, or the PRACH group) to which the respective tx-endpoints belong. The capability information 810 may indicate each tx-endpoint via a static-low-level-tx-endpoint parameter. The capability information 810 may additionally or alternatively indicate each rx-endpoint and the downlink direction groups (e.g., the downlink channel group or the SSB group) to which the respective rx-endpoints belong. The capability information 810 may indicate each rx-endpoint via a static-low-level-rx-endpoint parameter.

At 820, the DU 804 may allocate eAxCIDs to RU endpoints based on the capability information 810. For example, the DU 804 may allocate group indices based on the quantity of groups indicated by the capability information 810. The DU 804 may also allocate group layers/streams within a group based on the quantity of endpoints indicated by the capability information 810.

At 822, the DU 804 may apply an encoding technique to the RU port identifier of an eAxC message. In some examples, the DU 804 may use the eAxCIDs allocations to apply the encoding technique. In some examples, the DU 804 may apply a first encoding technique in which dedicated bits are allocated to a group index and to a per-group layer/stream index. In some examples, the DU 804 may apply a second encoding technique in which a bitmask may be used to indicate the group and a varying quantity of bits may be used to reference the endpoints associated with the respective group.

At 824, the DU 804 may encode a group index based on the encoding technique. For example, the DU 804 may use a first portion of the RU port identifier to encode the group index. At 826, the DU 804 may encode an RU endpoint based on the encoding technique. For example, the DU 804 may use a second portion of the RU port identifier to encode the per-group layer/stream index.

Referring to the example of FIG. 6, the first portion of the RU port identifier may correspond to the group index 612. In such examples, the first portion of the RU port identifier may correspond to a static bit width (e.g., two bits). The DU 804 may determine to which of the blocks 620, 622, 624 the eAxC message corresponds based on the eAxCIDs allocations. The DU 804 may then encode information regarding the block via the group index and the first portion of the RU port identifier (e.g., at 824). The second portion of the RU port identifier may correspond to the per-group layer/stream index 614. Similar to the first portion of the RU port identifier, the second portion of the RU port identifier may correspond to a static bit width (e.g., six bits) to accommodate the maximum quantity of endpoints within an endpoint group. The DU 804 may encode information regarding the RU endpoint via the per-group layer/stream index and the second portion of the RU port identifier (e.g., at 826).

Referring to the example of FIG. 7, the first portion of the RU port identifier may correspond to a bitmask with a bit width that may be based on the quantity of endpoint groups. The DU 804 may determine the endpoint group and the block 720, 722, 724 based on the bitmask. The DU 804 may then encode information regarding the block via the group index and the first portion of the RU port identifier (e.g., at 824). The second portion of the RU port identifier may correspond to the remaining bits of the RU port identifier after the bitmask. As shown in FIG. 7, the bit width of the second portion of the RU port identifier may depend on the bit width of the RU port identifier and the bit width of the bitmask. The DU 804 may encode information regarding the RU endpoint via the per-group layer/stream index and the second portion of the RU port identifier (e.g., at 826).

In some examples, the DU 804 may transmit an eAxC allocation configuration 830 that is received by the RU 802. The eAxC allocation configuration 830 may indicate whether the DU 804 is applying the first encoding technique or the second encoding technique to the RU port identifiers of an eAxC message. The eAxC allocation configuration 830 may additionally or alternatively indicate a mapping between endpoint groups and endpoints. For example, the eAxC allocation configuration 830 may indicate that a first group index ("00") corresponds to the first group, a second group index ("01") corresponds to the second group, and a third group index ("10") corresponds to the third group. In an example in which the DU 804 applies the second encoding technique, the eAxC allocation configuration 830 may indicate that the MSB set to a first value ("1") corresponds to the first group, the first two MSBs set to a second value ("01") corresponds to the second group, and the first three MSBs set to a third value ("001") corresponds to the third group.

At 840, the RU 802 may configure endpoint groups based on the eAxC allocation configuration 830. For example, based on the encoding technique, the RU 802 may determine how to decode the RU port identifier of an eAxC message to determine which group the eAxC message belongs. The RU

802 may use the group index to determine where (e.g., to which hardware component) to route the eAxC message for processing.

As shown in FIG. 8, the DU 804 may transmit an eAxC message 850 that is received by the RU 802. The eAxC message 850 may include an RU port identifier that is encoded using the first encoding technique or the second encoding technique.

At 860, the RU 802 may decode the RU port identifier of the eAxC message 850. The RU 802 may apply the configured endpoints groups (e.g., at 840) to decode the RU port identifier. At 862, the RU 802 may identify an endpoint group based on the decoded RU port identifier. For example, a first portion of the RU port identifier may be encoded with a group index corresponding to the endpoint group. At 864, the RU 802 may index the eAxC message. For example, the RU 802 may use a second portion of the RU port identifier to determine an RU endpoint of the endpoint group.

Referring to the example of FIG. 6, the first portion of the RU port identifier may correspond to the group index 612. In such examples, the first portion of the RU port identifier may correspond to a static bit width (e.g., two bits). The RU 802 may determine which of the blocks 620, 622, 624 the eAxC message corresponds to based on the group index 612. The second portion of the RU port identifier may correspond to the per-group layer/stream index 614. Similar to the first portion of the RU port identifier, the second portion of the RU port identifier may correspond to a static bit width (e.g., six bits) to accommodate the maximum quantity of endpoints within an endpoint group.

Referring to the example of FIG. 7, the first portion of the RU port identifier may correspond to a bitmask with a bit width that may be based on the quantity of endpoint groups. The RU 802 may determine the endpoint group and the block 720, 722, 724 based on the bitmask. The second portion of the RU port identifier may correspond to the remaining bits of the RU port identifier after the bitmask. As shown in FIG. 7, the bit width of the second portion of the RU port identifier may depend on the bit width of the RU port identifier and the bit width of the bitmask.

At 870, the RU 802 may route the eAxC message 850 to the hardware component configured to process the eAxC message. For example, the RU 802 may route PUSCH control plane messages to a first hardware component for processing, may route SRS control plane messages to a second hardware component for processing, may route PRACH control plane messages to a third hardware component for processing, may route PDSCH control plane messages to a fourth hardware component for processing, and may route SSB control plane messages to a fifth hardware component for processing. However, other examples may include additional or alternate combinations for routing messages to appropriate hardware components.

In the above description of FIG. 8, the DU 804 transmits an eAxC allocation configuration 830 that the RU 802 may use to configure the endpoints groups (e.g., at 840). In some examples, the DU 804 may forego transmitting the eAxC allocation configuration 830 to the RU 802. In such examples, the RU 802 may sample, at 832, one or more eAxC messages to configure the endpoints groups (e.g., at 840). For example, the RU 802 may receive eAxC messages 834 from the DU 804. The RU 802 may use properties of the eAxC messages 834 to determine the message type associated with the eAxC messages 834. For example, the RU 802 may determine that a first eAxC message of the eAxC messages 834 corresponds to a PRACH control plane message based on properties of the first eAxC message. Based on properties of a second eAxC message and a third eAxC message of the eAxC messages 834, the RU 802 may determine that the second eAxC message corresponds to an uplink channel control plane message and that the third eAxC message corresponds to an SRS control plane message. The RU 802 may use the MSBs of the RU port identifier associated with the respective eAxC messages to map the MSBs to the respective group. For example, the RU 802 may determine that two MSBs are used to indicate a group and the remaining bits of the RU port identifier are used to indicate the RU endpoint within the group. In such examples, the RU 802 may determine that the DU 804 applied the first encoding technique and associate a group index (e.g., "00," "01," and "11") with each of the three uplink direction groups.

In some examples, the RU endpoints associated with a group may be associated with a same set of characteristics. For example, uplink endpoints may be associated with a first set of properties and downlink endpoints may be associated with a second set of properties. In some examples, uplink channel endpoints may be associated with a first set of properties, SRS endpoints may be associated with a second set of properties, PRACH endpoints may be associated with a third set of properties, downlink channel endpoints may be associated with a fourth set of properties, and SSB endpoints may be associated with a fifth set of properties.

In another example, the RU 802 may determine that an MSB bit is being set to a first value (e.g., a "1") to indicate a group and that a varying quantity of bits are being used to indicate the RU endpoint within the group. In such examples, the RU 802 may determine that the DU 804 applied the second encoding technique and associate a bitmask (e.g., "1," "01," and "001") with each of the three uplink direction groups.

The RU 802 may then configure the endpoint groups, at 840, based on the sampling of the eAxC messages 834. For example, based on the sampling of the eAxC messages 834 (e.g., at 832), the RU 802 may determine whether the DU 804 applied the first encoding technique or the second encoding technique. When the first encoding technique is applied, the RU 802 may determine that a first group index ("00") corresponds to the first group, a second group index ("01") corresponds to the second group, and a third group index ("10") corresponds to the third group. When the second encoding technique is applied, the RU 802 may determine that the MSB set to a first value ("1") corresponds to the first group, the first two MSBs set to a second value ("01") corresponds to the second group, and the first three MSBs set to a third value ("001") corresponds to the third group.

Figure 9:
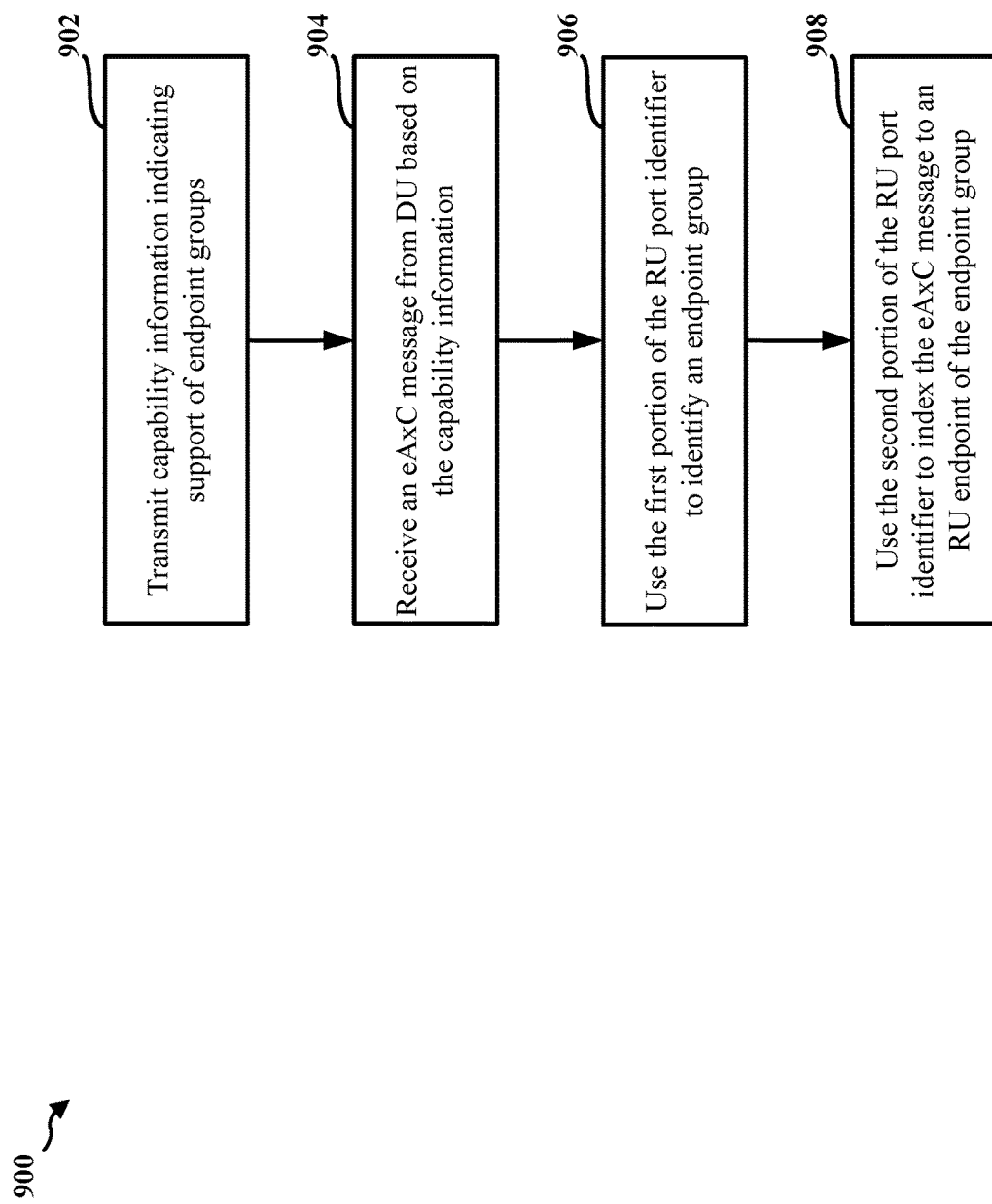
FIG. 9 is a flowchart of a method of wireless communication at an RU, in accordance with the teachings disclosed herein.

FIG. 9 is a flowchart 900 of a method of wireless communication. The method may be performed by an RU of a base station (e.g., the RU 180B, the RU 802, and/or an apparatus 1302 of FIG. 13). The method may facilitate simplified switching at the RU based on an eAxC allocation policy. In some examples, the RU may facilitate communication in an O-RAN.

At 902, the RU transmits, to a DU, capability information indicating support of endpoint groups, each endpoint group associated with a respective set of RU endpoints, as described in connection with the capability information 810 of FIG. 8. For example, 902 may be performed by a capability component 1340 of the apparatus 1302 of FIG. 13. The endpoint groups may include a first set of groups for uplink endpoints and/or a second set of groups for downlink endpoints.

In some examples, the capability information may indicate a quantity of endpoint groups, and a quantity of RU endpoints associated with respective endpoint groups.

At 904, the RU receives an eAxC message from the DU based on the capability information, the eAxC message including a DU port identifier, a band sector identifier, a component carrier identifier, and an RU port identifier, as described in connection with the eAxC message 850 of FIG. 8. For example, 904 may be performed by a message component 1342 of the apparatus 1302 of FIG. 13.

At 906, the RU uses a first portion of the RU port identifier to identify an endpoint group, the respective set of RU endpoints of the endpoint group associated with a set of characteristics, as described in connection with 862 of FIG. 8. For example, 906 may be performed by a first portion component 1344 of the apparatus 1302 of FIG. 13.

In some examples, the set of characteristics may be based on one or more of a data layer, a spatial stream, a numerology, and a channel.

At 908, the RU uses a second portion of the RU port identifier to index the eAxC message to an RU endpoint of the endpoint group, as described in connection with 864 of FIG. 8. For example, 908 may be performed by a second portion component 1346 of the apparatus 1302 of FIG. 13.

In some examples, the first portion of the RU port identifier may correspond to a group index, and the second portion of the RU port identifier may correspond to a per-group layer/stream index.

In some examples, the first portion and the second portion may facilitate hierarchical addressing of RU endpoints of the RU.

Figure 10:
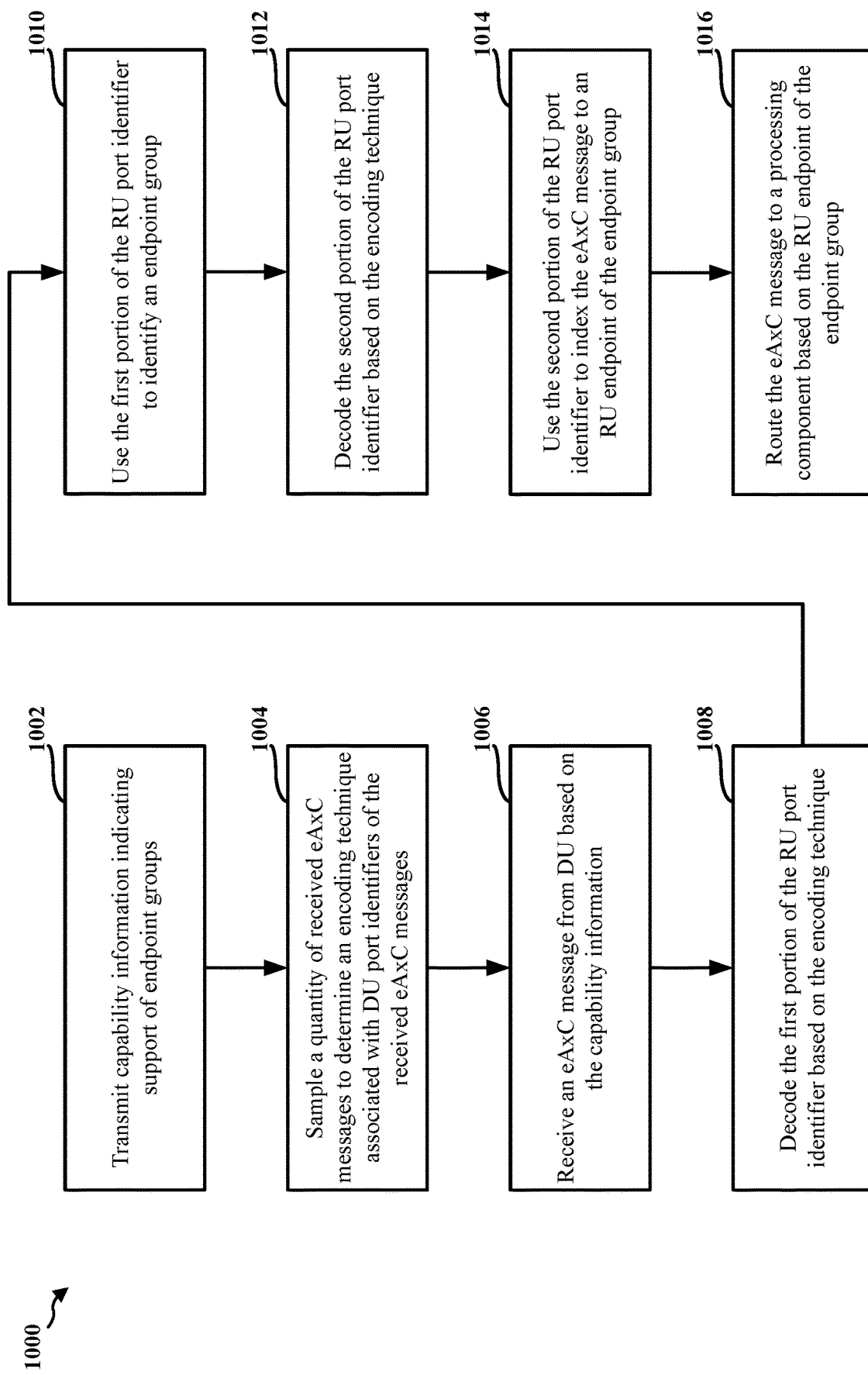
FIG. 10 is a flowchart of a method of wireless communication at an RU, in accordance with the teachings disclosed herein.

FIG. 10 is a flowchart 1000 of a method of wireless communication. The method may be performed by an RU of a base station (e.g., the RU 180B, the RU 802, and/or an apparatus 1102 of FIG. 11). The method may facilitate simplified switching at the RU based on an eAxC allocation policy. In some examples, the RU may facilitate communication in an O-RAN.

At 1002, the RU transmits, to a DU, capability information indicating support of endpoint groups, each endpoint group associated with a respective set of RU endpoints, as described in connection with the capability information 810 of FIG. 8. For example, 1002 may be performed by a capability component 1340 of the apparatus 1302 of FIG. 13. The endpoint groups may include a first set of groups for uplink endpoints and/or a second set of groups for downlink endpoints.

In some examples, the capability information may indicate a quantity of endpoint groups, and a quantity of RU endpoints associated with respective endpoint groups.

At 1006, the RU receives an eAxC message from the DU based on the capability information, the eAxC message including a DU port identifier, a band sector identifier, a component carrier identifier, and an RU port identifier, as described in connection with the eAxC message 850 of FIG. 8. For example, 1006 may be performed by a message component 1342 of the apparatus 1302 of FIG. 13.

At 1010, the RU uses a first portion of the RU port identifier to identify an endpoint group, the respective set of RU endpoints of the endpoint group associated with a set of characteristics, as described in connection with 862 of FIG. 8. For example, 1010 may be performed by a first portion component 1344 of the apparatus 1302 of FIG. 13.

In some examples, the set of characteristics may be based on one or more of a data layer, a spatial stream, a numerology, and a channel.

At 1014, the RU uses a second portion of the RU port identifier to index the eAxC message to an RU endpoint of the endpoint group, as described in connection with 864 of FIG. 8. For example, 1014 may be performed by a second portion component 1346 of the apparatus 1302 of FIG. 13.

In some examples, the first portion of the RU port identifier may correspond to a group index, and the second portion of the RU port identifier may correspond to a per-group layer/stream index.

In some examples, the first portion and the second portion may facilitate hierarchical addressing of RU endpoints of the RU.

At 1016, the RU may route the eAxC message to a processing component based on the RU endpoint of the endpoint group, the processing component configured to process eAxC messages associated with the set of characteristics, as described in connection with 870 of FIG. 8. For example, 1016 may be performed by a routing component 1348 of the apparatus 1302 of FIG. 13.

At 1004, the RU may sample a quantity of received eAxC messages to determine an encoding technique associated with respective RU port identifiers of the received eAxC messages, the encoding technique used to encode the first portion and the second portion of the respective RU port identifiers, as described in connection with 832 of FIG. 8. For example, 1004 may be performed by a sampling component 1350 of the apparatus 1302 of FIG. 13.

At 1008, the RU may decode the first portion of the RU port identifier based on the encoding technique, as described in connection with 862 of FIG. 8. For example, 1008 may be performed by a decoding component 1352 of the apparatus 1302 of FIG. 13.

At 1012, the RU may decode the second portion of the RU port identifier based on the encoding technique, as described in connection with 864 of FIG. 8. For example, 1012 may be performed by the decoding component 1352 of the apparatus 1302 of FIG. 13.

In some examples, the decoding of the first portion of the RU port identifier may be based on a static bit width, and the decoding of the second portion of the RU port identifier may be based on a linear addressing of RU endpoints across the endpoint groups, as described in connection with the example of FIG. 6

In some examples, the decoding of the first portion of the RU port identifier may be based on a bitmask with a bit width corresponding to the endpoint group, and the decoding of the second portion of the RU port identifier may be based on an RU port identifier bit width and the bit width of the bitmask, as described in connection with the example of FIG. 7.

Figure 11:
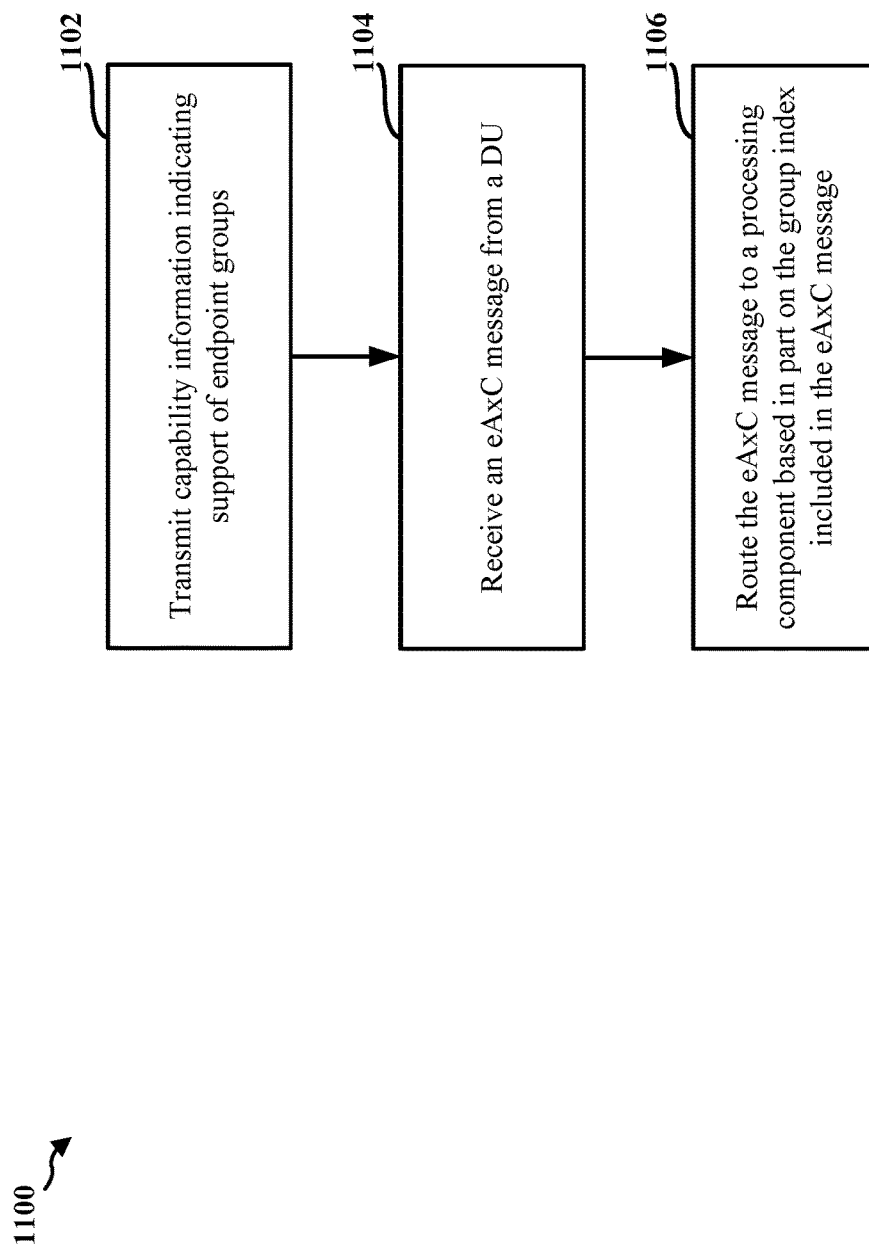
FIG. 11 is a flowchart of a method of wireless communication at an RU, in accordance with the teachings disclosed herein.

FIG. 11 is a flowchart 1100 of a method of wireless communication. The method may be performed by an RU of a base station (e.g., the RU 180B, the RU 802, and/or an apparatus 1302 of FIG. 13). The method may facilitate simplified switching at the RU based on an eAxC allocation policy. In some examples, the RU may facilitate communication in an O-RAN.

At 1102, the RU transmits capability information indicating support of endpoint groups, as described in connection with the capability information 810 of FIG. 8. For example, 1102 may be performed by a capability component 1340 of the apparatus 1302 of FIG. 13. In some examples, the capability information may indicate a quantity of endpoint groups and a respective set of endpoints associated with each endpoint group. For example, the capability information may indicate that there are 50 endpoints associated with a first group, 25 endpoints associated with a second group, and 10 endpoints associated with a third group. In some examples, the capability information may indicate which endpoints are associated with which endpoint group (e.g., via a static-low-level-[tr]x-endpoint parameter).

In some examples, the endpoint groups include a first set of groups for uplink endpoints and a second set of groups for downlink endpoints. For example, the endpoint groups may include an uplink channel group, an SRS group, and a PRACH group associated with the uplink direction. The endpoint groups may include a downlink channel group and an SSB group associated with the downlink direction. However, other examples may include additional or alternative groups associated with a direction.

In some examples, the RU endpoints associated with a group may be associated with a same set of characteristics. For example, uplink endpoints may be associated with a first set of properties and downlink endpoints may be associated with a second set of properties. In some examples, uplink channel endpoints may be associated with a first set of properties, SRS endpoints may be associated with a second set of properties, PRACH endpoints may be associated with a third set of properties, downlink channel endpoints may be associated with a fourth set of properties, and SSB endpoints may be associated with a fifth set of properties.

At 1104, the RU receives an eAxC message from the DU, as described in connection with the eAxC message 850 of FIG. 8. For example, 1104 may be performed by a message component 1342 of the apparatus 1302 of FIG. 13. The eAxC message may include an M-plane message, a C-plane message, or an S-plane message including an eAxC. For example, the eAxC may include a DU port identifier, a band sector identifier, a CC identifier, and an RU port identifier, as described in connection with the eAxC 400 of FIG. 4. The RU port identifier may be encoded to include a group index and a per-group layer/stream index, as described in connection with the RU port identifier 610 of FIG. 6 and/or the RU port identifier 710 of FIG. 7. The group index and the per-group layer/stream index may be based on the capability information.

At 1106, the RU routes the eAxC message to a processing component based in part on the group index included in the eAxC message, as described in connection with 870 of FIG. 8. For example, 1106 may be performed by a routing component 1348 of the apparatus 1302 of FIG. 13.

Figure 12:
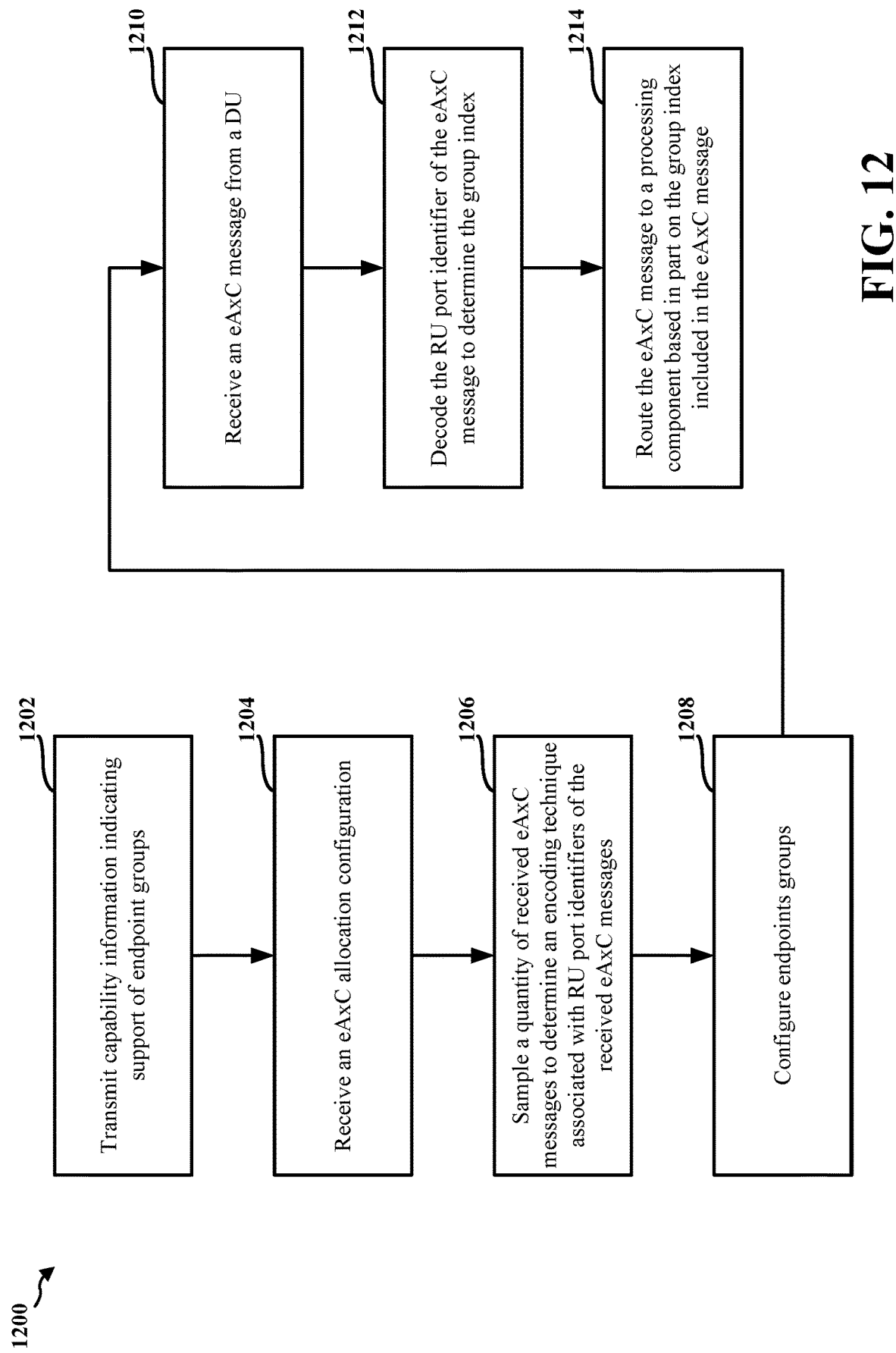
FIG. 12 is a flowchart of a method of wireless communication at an RU, in accordance with the teachings disclosed herein.

FIG. 12 is a flowchart 1200 of a method of wireless communication. The method may be performed by an RU of a base station (e.g., the RU 180B, the RU 802, and/or an apparatus 1302 of FIG. 13). The method may facilitate simplified switching at the RU based on an eAxC allocation policy. In some examples, the RU may facilitate communication in an O-RAN.

At 1202, the RU transmits capability information indicating support of endpoint groups, as described in connection with the capability information 810 of FIG. 8. For example, 1202 may be performed by a capability component 1340 of the apparatus 1302 of FIG. 13. In some examples, the capability information may indicate a quantity of endpoint groups and a respective set of endpoints associated with each endpoint group. For example, the capability information may indicate that there are 50 endpoints associated with a first group, 25 endpoints associated with a second group, and 10 endpoints associated with a third group. In some examples, the capability information may indicate which endpoints are associated with which endpoint group (e.g., via a static-low-level-[tr]x-endpoint parameter). In some examples, the endpoint groups include a first set of groups for uplink endpoints and a second set of groups for downlink endpoints. For example, the endpoint groups may include an uplink channel group, an SRS group, and a PRACH group associated with the uplink direction. The endpoint groups may include a downlink channel group and an SSB group associated with the downlink direction. However, other examples may include additional or alternative groups associated with a direction.

In some examples, the RU endpoints associated with a group may be associated with a same set of characteristics. For example, uplink endpoints may be associated with a first set of properties and downlink endpoints may be associated with a second set of properties. In some examples, uplink channel endpoints may be associated with a first set of properties, SRS endpoints may be associated with a second set of properties, PRACH endpoints may be associated with a third set of properties, downlink channel endpoints may be associated with a fourth set of properties, and SSB endpoints may be associated with a fifth set of properties.

At 1210, the RU receives an eAxC message from the DU, as described in connection with the eAxC message 850 of FIG. 8. For example, 1210 may be performed by a message component 1342 of the apparatus 1302 of FIG. 13. The eAxC message may include an M-plane message, a C-plane message, or an S-plane message including an eAxC. For example, the eAxC may include an DU port identifier, a band sector identifier, a CC identifier, and an RU port identifier, as described in connection with the eAxC identifier 400 of FIG. 4. The RU port identifier may be encoded to include a group index and a per-group layer/stream index, as described in connection with the RU port identifier 610 of FIG. 6 and/or the RU port identifier 710 of FIG. 7. The group index and the per-group layer/stream index may be based on the capability information.

At 1214, the RU routes the eAxC message to a processing component based in part on the group index included in the eAxC message, as described in connection with 870 of FIG. 8. For example, 1214 may be performed by a routing component 1348 of the apparatus 1302 of FIG. 13.

In some examples, the RU may decode, at 1212, the RU port identifier of the eAxC message to determine the group index included in the eAxC message, as described in connection with 860 of FIG. 8. For example, 1212 may be performed by a decoding component 1352 of the apparatus 1302 of FIG. 13. In some examples, the RU may use the MSBs of the RU port identifier to determine the group index. For example, the first encoding technique (e.g., dedicated bits for the group index and the per-group layer/stream index) may be used to encode the RU port identifier to include the group index. When the first encoding technique is used to encode the RU port identifier, the RU may determine the group index based on a static size field for the group index. For example, in the example of FIG. 6, the group index 612 may be determined based on the two MSBs of the RU port identifier 610. The RU port identifier may also include a static size field dedicated to the per-group layer/stream index. For example, in the example of FIG. 6, each group index is associated with a block of 64 group layers/streams based on the six bits dedicated to the per-group layer/stream index 614 of the RU port identifier 610. Based on the static size field dedicated to the per-group layer/stream index, addressing of the per-group layer/stream indexes across the endpoint groups may be linear.

In other examples, the second encoding technique (e.g., a bitmask and a varying per-group layer/stream index size) may be used to encode the RU port identifier to include the group index. When the second encoding technique is used to encode the RU port identifier, the RU may determine the group index based on the location of the first value (e.g., "1") in the MSBs of the RU port identifier. For example, in the example of FIG. 7, a first group index may be indicated when the MSB is set to the first value (e.g., "1"), a second group index may be indicated when the next MSB is set to the first value (e.g., "01"), and a third group index may be indicated when the next MSB is set to the first value (e.g., "001"). When a bitmask is used to indicate the group index, the size of the bits used to indicate the per-group layer/stream index may vary. For example, the size of the per-group layer/stream index may be based on the quantity of bits of the RU port identifier and the quantity of bits used to indicate the group index. For example, in the example of FIG. 7 in which the RU port identifier is seven bits, the size of the per-group layer/stream index varies between four bits and six bits based on the quantity of bits used to indicate the group index.

In some examples, the RU may decode the RU port identifier (e.g., at 1212) based on configured endpoint groups. For example, at 1204, the RU may receive an eAxC allocation configuration, as described in connection with the eAxC allocation configuration 830 of FIG. 8. For example, 1204 may be performed by a configuration component 1354 of the apparatus 1302 of FIG. 13. The eAxC allocation configuration may indicate whether the DU is applying the first encoding technique or the second encoding technique to the RU port identifiers of an eAxC message. The eAxC allocation configuration may additionally or alternatively indicate a mapping between endpoint groups and endpoints. For example, the eAxC allocation configuration may indicate that a first group index ("00") corresponds to the first group, a second group index ("01") corresponds to the second group, and a third group index ("10") corresponds to the third group. When applying the second encoding technique, the eAxC allocation configuration may indicate that the MSB set to a first value ("1") corresponds to the first group, the first two MSBs set to a second value ("01") corresponds to the second group, and the first three MSBs set to a third value ("001") corresponds to the third group.

At 1208, the RU may configure endpoint groups based on the eAxC allocation configuration, as described in connection with 840 of FIG. 8. For example, 1208 may be performed by the configuration component 1354 of the apparatus 1302 of FIG. 13. For example, based on the encoding technique, the RU may determine how to decode the RU port identifier of an eAxC message to determine which group the eAxC message belongs.

In some examples, the RU may determine endpoint groups without receiving an eAxC allocation configuration from the DU. For example, at 1206, the RU may sample a quantity of eAxC messages to determine the encoding technique associated with the RU port identifiers of the received eAxC messages, as described in connection with 832 of FIG. 8. For example, 1206 may be performed by a sampling component 1350 of the apparatus 1302 of FIG. 13. For example, the RU may receive eAxC messages 834 from the DU 804. The RU may use properties of the eAxC messages to determine the message type associated with the received eAxC messages. For example, the RU may determine that a first eAxC message of the plurality of eAxC messages corresponds to a PRACH control plane message based on properties of the first eAxC message. Based on properties of a second eAxC message and a third eAxC message of the plurality of eAxC messages, the RU may determine that the second eAxC message corresponds to an uplink channel control plane message and that the third eAxC message corresponds to an SRS control plane message. The RU may use the MSBs of the RU port identifier associated with the respective eAxC messages to map the MSBs to the respective group. For example, the RU may determine that two MSBs are used to indicate a group and the remaining bits of the RU port identifier are used to indicate the RU endpoint within the group. In such examples, the RU may determine that the DU applied the first encoding technique and associate a group index (e.g., "00," "01," and "11") with each of the three uplink direction groups.

In another example, the RU may determine that an MSB bit is being set to a first value (e.g., a "1") to indicate a group and that a varying quantity of bits are being used to indicate the RU endpoint within the group. In such examples, the RU may determine that the DU applied the second encoding technique and associate a bitmask (e.g., "1," "01," and "001") with each of the three uplink direction groups.

At 1208, the RU may then configure the endpoint groups based on the sampling of the eAxC messages, as described in connection with 840 of FIG. 8. For example, 1208 may be performed by the configuration component 1354 of the apparatus 1302 of FIG. 13. For example, based on the sampling of the plurality of eAxC messages, the RU may determine whether the DU applied the first encoding technique or the second encoding technique. When the first encoding technique is applied, the RU may determine that a first group index ("00") corresponds to the first group, a second group index ("01") corresponds to the second group, and a third group index ("10") corresponds to the third group. When the second encoding technique is applied, the RU may determine that the MSB set to a first value ("1") corresponds to the first group, the first two MSBs set to a second value ("01") corresponds to the second group, and the first three MSBs set to a third value ("001") corresponds to the third group.

Figure 13:
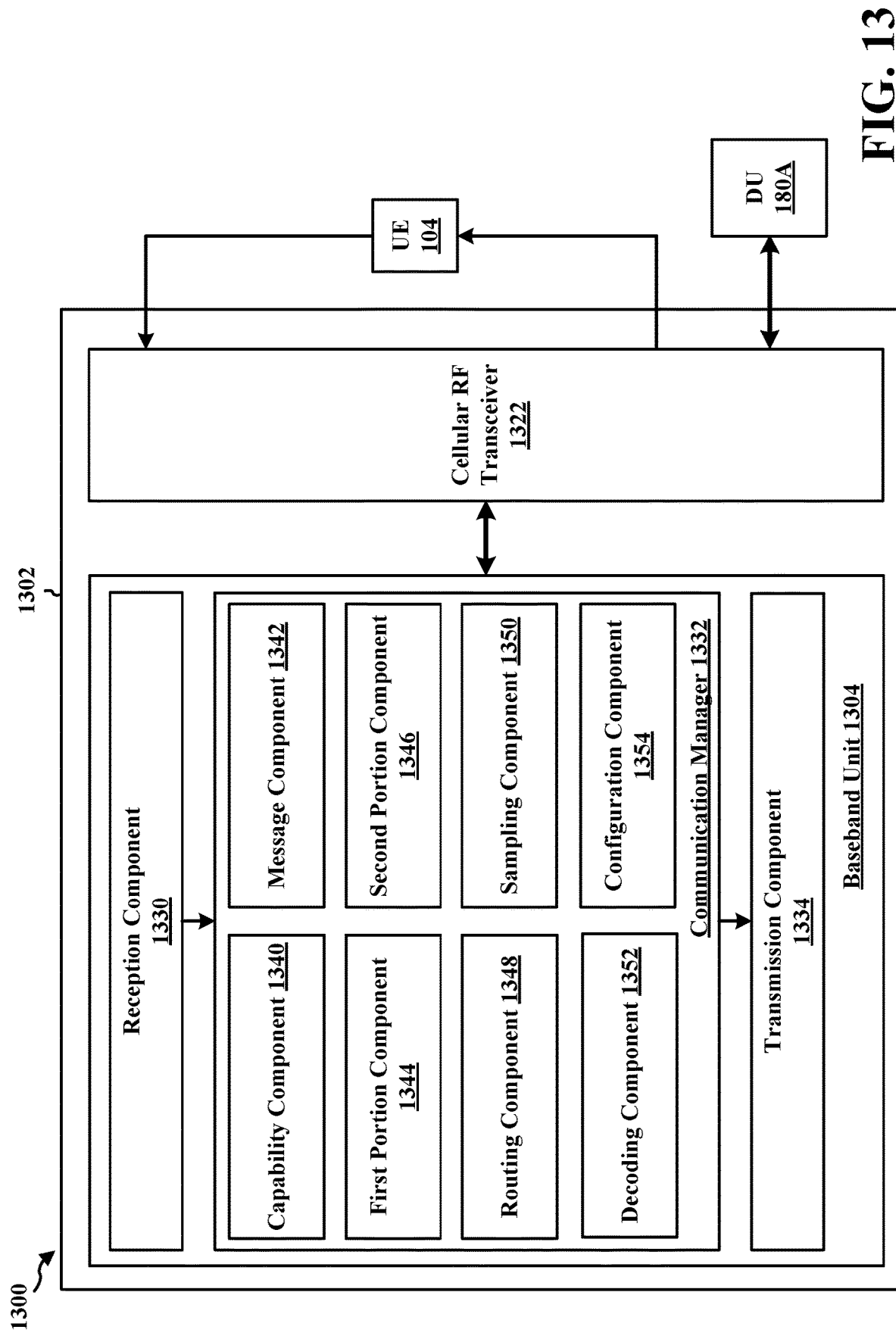
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 is an RU of a base station, a component of a base station, or may implement base station functionality. The apparatus 1302 includes a baseband unit 1304. The baseband unit 1304 may communicate through a cellular RF transceiver 1322 with the UE 104 and/or the DU 180A. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a capability component 1340 that is configured to transmitting, to a DU, capability information indicating support of endpoint groups, each endpoint group associated with a respective set of RU endpoints, for example, as described in connection with 902 of FIG. 9 and/or 1002 of FIG. 10. The example capability component 1340 may also be configured to transmit capability information indicating support of endpoint groups, for example, as described in connection with 1102 of FIG. 11 and/or 1202 of FIG. 12.

The communication manager 1332 also includes a message component 1342 that is configured to receive an eAxC message from the DU based on the capability information, the eAxC message including a DU port identifier, a band sector identifier, a component carrier identifier, and an RU port identifier, for example, as described in connection with 904 of FIG. 9 and/or 1006 of FIG. 10. The example message component 1342 may also be configured to receive an eAxC message from a DU, for example, as described in connection with 1104 of FIG. 11 and/or 1210 of FIG. 12.

The communication manager 1332 also includes a first portion component 1344 that is configured to use a first portion of the RU port identifier to identify an endpoint group, the respective set of RU endpoints of the endpoint group associated with a set of characteristics, for example, as described in connection with 906 of FIG. 9 and/or 1010 of FIG. 10.

The communication manager 1332 also includes a second portion component 1346 that is configured to use a second portion of the RU port identifier to index the eAxC message to an RU endpoint of the endpoint group, for example, as described in connection with 908 of FIG. 9 and/or 1014 of FIG. 10.

The communication manager 1332 also includes a routing component 1348 that is configured to route the eAxC message to a processing component based on the RU endpoint of the endpoint group, the processing component configured to process eAxC messages associated with the set of characteristics, for example, as described in connection with 1016 of FIG. 10. The example routing component 1348 may also be configured to route the eAxC message to a processing component based in part on the group index included in the eAxC message, for example, as described in connection with 1106 of FIG. 11 and/or 1214 of FIG. 12.

The communication manager 1332 also includes a sampling component 1350 that is configured to sample a quantity of received eAxC messages to determine an encoding technique associated with respective RU port identifiers of the received eAxC messages, the encoding technique used to encode the first portion and the second portion of the respective RU port identifiers, for example, as described in connection with 1004 of FIG. 10. The example sampling component 1350 may also be configured to sample a quantity of received eAxC messages to determine an encoding technique associated with RU port identifiers of the received eAxC messages, for example, as described in connection with 1206 of FIG. 12.

The communication manager 1332 also includes a decoding component 1352 that is configured to decode the first portion of the RU port identifier based on the encoding technique, for example, as described in connection with 1008 of FIG. 10. The example decoding component 1352 may also be configured to decode the second portion of the RU port identifier based on the encoding technique, for example, as described in connection with 1012 of FIG. 10. The example decoding component 1352 may also be configured to decode the RU port identifier of the eAxC message to determine the group index, for example, as described in connection with 1212 of FIG. 12.

The communication manager 1332 also includes a configuration component 1354 that is configured to receive an eAxC allocation configuration, for example, as described in connection with 1204 of FIG. 12. The example configuration component 1354 may also be configured to configure endpoints groups, for example, as described in connection with 1208 of FIG. 12.

The apparatus may include additional components that perform each of the blocks of the algorithm in the flowcharts of FIGS. 9, 10, 11, and/or 12. As such, each block in the flowcharts of FIGS. 9, 10, 11, and/or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes transmitting, to a DU, capability information indicating support of endpoint groups, each endpoint group associated with a respective set of RU endpoints The example apparatus 1302 also includes means for receiving an eAxC message from the DU based on the capability information, the eAxC message including a DU port identifier, a band sector identifier, a component carrier identifier, and an RU port identifier. The example apparatus 1302 also includes means for using a first portion of the RU port identifier to identify an endpoint group, the respective set of RU endpoints of the endpoint group associated with a set of characteristics. The example apparatus 1302 also includes means for using a second portion of the RU port identifier to index the eAxC message to an RU endpoint of the endpoint group.

In another configuration, the example apparatus 1302 also includes means for routing the eAxC message to a processing component based on the RU endpoint of the endpoint group, the processing component configured to process eAxC messages associated with the set of characteristics.

In another configuration, the example apparatus 1302 also includes means for sampling a quantity of received eAxC messages to determine an encoding technique associated with respective RU port identifiers of the received eAxC messages, the encoding technique used to encode the first portion and the second portion of the respective RU port identifiers. The example apparatus 1302 also includes means for decoding the first portion of the RU port identifier based on the encoding technique. The example apparatus 1302 also includes means for decoding the second portion of the RU port identifier based on the encoding technique.

In another configuration, the example apparatus 1302 also includes means for decoding the first portion of the RU port identifier is based on a static bit width. The example apparatus 1302 also includes means for decoding the second portion of the RU port identifier is based on linear addressing of RU endpoints across the endpoint groups.

In another configuration, the example apparatus 1302 also includes means for decoding the first portion of the RU port identifier is based on a bitmask with a bit width corresponding to the endpoint group. The example apparatus 1302 also includes means for decoding the second portion of the RU port identifier is based on an RU port identifier bit width and the bit width of the bitmask.

In another configuration, the example apparatus 1302 also includes means for facilitating hierarchical addressing of RU endpoints of the RU.

In another configuration, the example apparatus 1302 includes means for transmitting, to a DU, capability information indicating support of endpoint groups, each endpoint group associated with a respective set of RU endpoints. The example apparatus 1302 also includes means for receiving an eAxC message from the DU, the eAxC message including a group index based on the capability information. The example apparatus 1302 also includes means for routing the eAxC message to a processing component based in part on the group index included in the eAxC message.

In another configuration, the example apparatus 1302 also includes means for sampling a quantity of received eAxC messages to determine an encoding technique associated with RU port identifiers of the received eAxC messages, the encoding technique used to encode the group index and a per-group layer/stream index of the RU port identifiers.

In another configuration, the example apparatus 1302 also includes means for receiving an eAxC allocation configuration from the DU.

In another configuration, the example apparatus 1302 also includes means for configuring endpoints groups.

In another configuration, the example apparatus 1302 also includes means for decoding the RU port identifier of the eAxC message to determine the group index.

The means may be one or more of the components of the apparatus 1302 configured to perform the functions recited by the means. As described supra, the apparatus 1302 may include the TX processor 316, the RX processor 370, and the controller/processor 375. As such, in one configuration, the means may be the TX processor 316, the RX processor 370, and the controller/processor 375 configured to perform the functions recited by the means.

Figure 14:
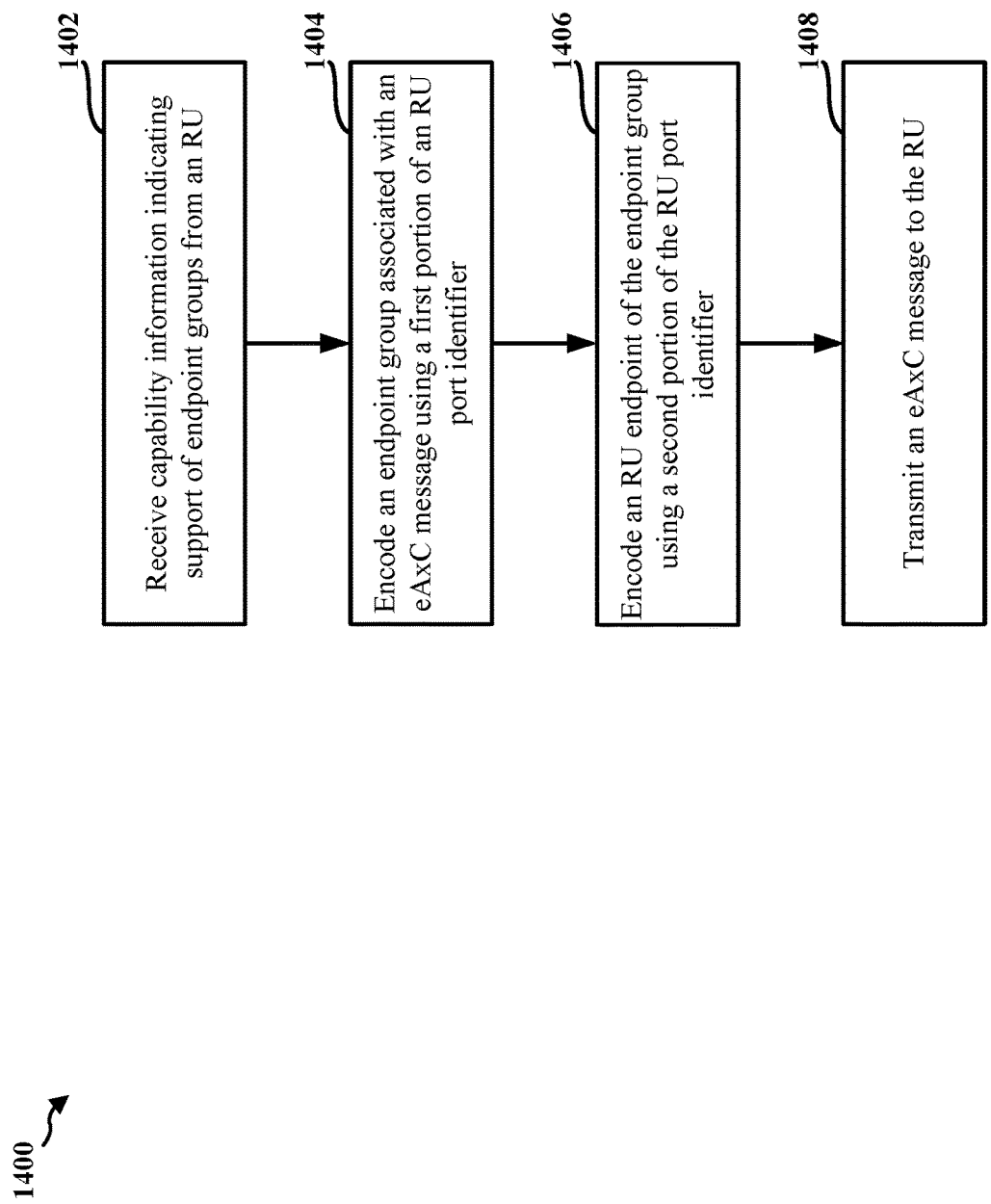
FIG. 14 is a flowchart of a method of wireless communication at a DU, in accordance with the teachings disclosed herein.

FIG. 14 is a flowchart 1400 of a method of wireless communication. The method may be performed by a DU of a base station (e.g., the DU 180A, the DU 804, and/or an apparatus 1802 of FIG. 18). The method may facilitate simplified switching at the RU based on an eAxC allocation policy. In some examples, the DU may facilitate communication in an O-RAN.

At 1402, the DU receives, from an RU, capability information indicating support of endpoint groups by the RU, each endpoint group associated with a respective set of RU endpoints, as described in connection with the capability information 810 of FIG. 8. For example, 1402 may be performed by a capability component 1840 of the apparatus 1802 of FIG. 18.

In some examples, the capability information may indicate a quantity of endpoint groups and a respective set of endpoints associated with each endpoint group. For example, the capability information may indicate that there are 50 endpoints associated with a first group, 25 endpoints associated with a second group, and 10 endpoints associated with a third group. In some examples, the capability information may indicate which endpoints are associated with which endpoint group (e.g., via a static-low-level-[tr]x-endpoint parameter).

In some examples, the endpoint groups include a first set of groups for uplink endpoints and/or a second set of groups for downlink endpoints. For example, the endpoint groups may include an uplink channel group, an SRS group, and a PRACH group associated with the uplink direction. The endpoint groups may include a downlink channel group and an SSB group associated with the downlink direction. However, other examples may include additional or alternative groups associated with a direction.

In some examples, the RU endpoints associated with a group may be associated with a same set of characteristics. For example, uplink endpoints may be associated with a first set of properties and downlink endpoints may be associated with a second set of properties. In some examples, uplink channel endpoints may be associated with a first set of properties, SRS endpoints may be associated with a second set of properties, PRACH endpoints may be associated with a third set of properties, downlink channel endpoints may be associated with a fourth set of properties, and SSB endpoints may be associated with a fifth set of properties.

At 1404, the DU encodes, based on the capability information, an endpoint group associated with the eAxC message using a first portion of an RU port identifier, the eAxC message including a DU port identifier, a band sector identifier, a component carrier identifier, and the RU port identifier, as described in connection with 824 of FIG. 8. For example, 1404 may be performed by a first portion component 1846 of the apparatus 1802 of FIG. 18.

At 1406, the DU encodes an RU endpoint of the endpoint group using a second portion of the RU port identifier, as described in connection with 826 of FIG. 8. For example, 1406 may be performed by a second portion component 1848 of the apparatus 1802 of FIG. 18.

In some examples, the first portion and the second portion may facilitate hierarchical addressing of RU endpoints of the RU.

In some examples, the encoding of the endpoint group using the first portion of the RU port identifier may be based on a static bit width, and the encoding of the RU endpoint point using the second portion of the RU port identifier may be based on a linear addressing of RU endpoints across the endpoint groups, as described in connection with the example of FIG. 6

In some examples, the encoding of the endpoint group using the first portion of the RU port identifier may be based on a bitmask with a bit width corresponding to the endpoint group, and the encoding of the RU endpoint point using the second portion of the RU port identifier may be based on an RU port identifier bit width and the bit width of the bitmask, as described in connection with the example of FIG. 7.

At 1408, the DU transmits the eAxC message to the RU, as described in connection with the eAxC message 850 of FIG. 8. For example, 1408 may be performed by a message component 1850 of the apparatus 1802 of FIG. 18. The eAxC message may include an M-plane message, a C-plane message, or an S-plane message including an eAxC identifier.

Figure 15:
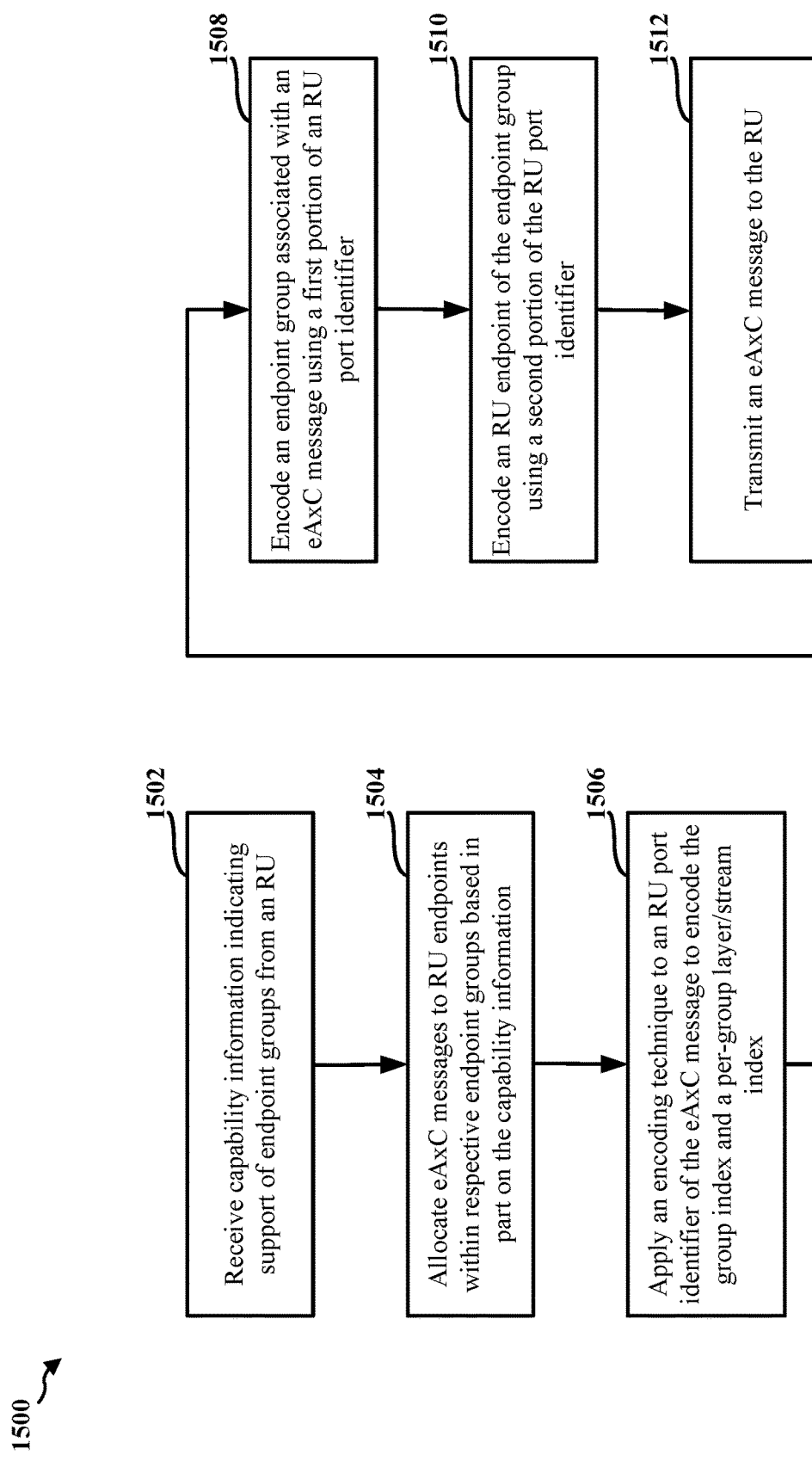
FIG. 15 is a flowchart of a method of wireless communication at a DU, in accordance with the teachings disclosed herein.

FIG. 15 is a flowchart 1500 of a method of wireless communication. The method may be performed by a DU of a base station (e.g., the DU 180A, the DU 804, and/or an apparatus 1802 of FIG. 18). The method may facilitate simplified switching at the RU based on an eAxC allocation policy. In some examples, the DU may facilitate communication in an O-RAN.

At 1502, the DU receives, from an RU, capability information indicating support of endpoint groups by the RU, each endpoint group associated with a respective set of RU endpoints, as described in connection with the capability information 810 of FIG. 8. For example, 1502 may be performed by a capability component 1840 of the apparatus 1802 of FIG. 18.

In some examples, the capability information may indicate a quantity of endpoint groups and a respective set of endpoints associated with each endpoint group. For example, the capability information may indicate that there are 50 endpoints associated with a first group, 25 endpoints associated with a second group, and 10 endpoints associated with a third group. In some examples, the capability information may indicate which endpoints are associated with which endpoint group (e.g., via a static-low-level-[tr]x-endpoint parameter).

In some examples, the endpoint groups include a first set of groups for uplink endpoints and/or a second set of groups for downlink endpoints. For example, the endpoint groups may include an uplink channel group, an SRS group, and a PRACH group associated with the uplink direction. The endpoint groups may include a downlink channel group and an SSB group associated with the downlink direction. However, other examples may include additional or alternative groups associated with a direction.

In some examples, the RU endpoints associated with a group may be associated with a same set of characteristics. For example, uplink endpoints may be associated with a first set of properties and downlink endpoints may be associated with a second set of properties. In some examples, uplink channel endpoints may be associated with a first set of properties, SRS endpoints may be associated with a second set of properties, PRACH endpoints may be associated with a third set of properties, downlink channel endpoints may be associated with a fourth set of properties, and SSB endpoints may be associated with a fifth set of properties.

At 1504, the DU may allocate an eAxC message to an RU endpoint of an endpoint group based on a set of characteristics associated with the eAxC message, as described in connection with 820 of FIG. 8. For example, 1504 may be performed by an allocation component 1842 of the apparatus 1802 of FIG. 18. The DU may allocate group indices based on the quantity of groups indicated by the capability information. The DU may also allocate group layers/streams within a group based on the quantity of endpoints indicated by the capability information. The set of characteristics may be based on one or more of a data layer, a spatial stream, a numerology, and a channel.

At 1506, the DU may apply an encoding technique to an RU port identifier, as described in connection with 822 of FIG. 8. For example, 1506 may be performed by an encoding component 1844 of the apparatus 1802 of FIG. 18. In some examples, the DU may use the encoding technique to encode a group index using a first portion of the RU port identifier and a per-group layer/stream index using a second portion of the RU port identifier.

At 1508, the DU encodes, based on the capability information, an endpoint group associated with the eAxC message using a first portion of an RU port identifier, the eAxC message including a DU port identifier, a band sector identifier, a component carrier identifier, and the RU port identifier, as described in connection with 824 of FIG. 8. For example, 1508 may be performed by a first portion component 1846 of the apparatus 1802 of FIG. 18.

At 1510, the DU encodes an RU endpoint of the endpoint group using a second portion of the RU port identifier, as described in connection with 826 of FIG. 8. For example, 1510 may be performed by a second portion component 1848 of the apparatus 1802 of FIG. 18.

In some examples, the first portion and the second portion may facilitate hierarchical addressing of RU endpoints of the RU.

At 1512, the DU transmits the eAxC message to the RU, as described in connection with the eAxC message 850 of FIG. 8. For example, 1512 may be performed by a message component 1850 of the apparatus 1802 of FIG. 18. The eAxC message may include an M-plane message, a C-plane message, or an S-plane message including an eAxC identifier.

In some examples, the encoding of the endpoint group using the first portion of the RU port identifier may be based on a static bit width, and the encoding of the RU endpoint point using the second portion of the RU port identifier may be based on a linear addressing of RU endpoints across the endpoint groups, as described in connection with the example of FIG. 6

In some examples, the encoding of the endpoint group using the first portion of the RU port identifier may be based on a bitmask with a bit width corresponding to the endpoint group, and the encoding of the RU endpoint point using the second portion of the RU port identifier may be based on an RU port identifier bit width and the bit width of the bitmask, as described in connection with the example of FIG. 7.

Figure 16:
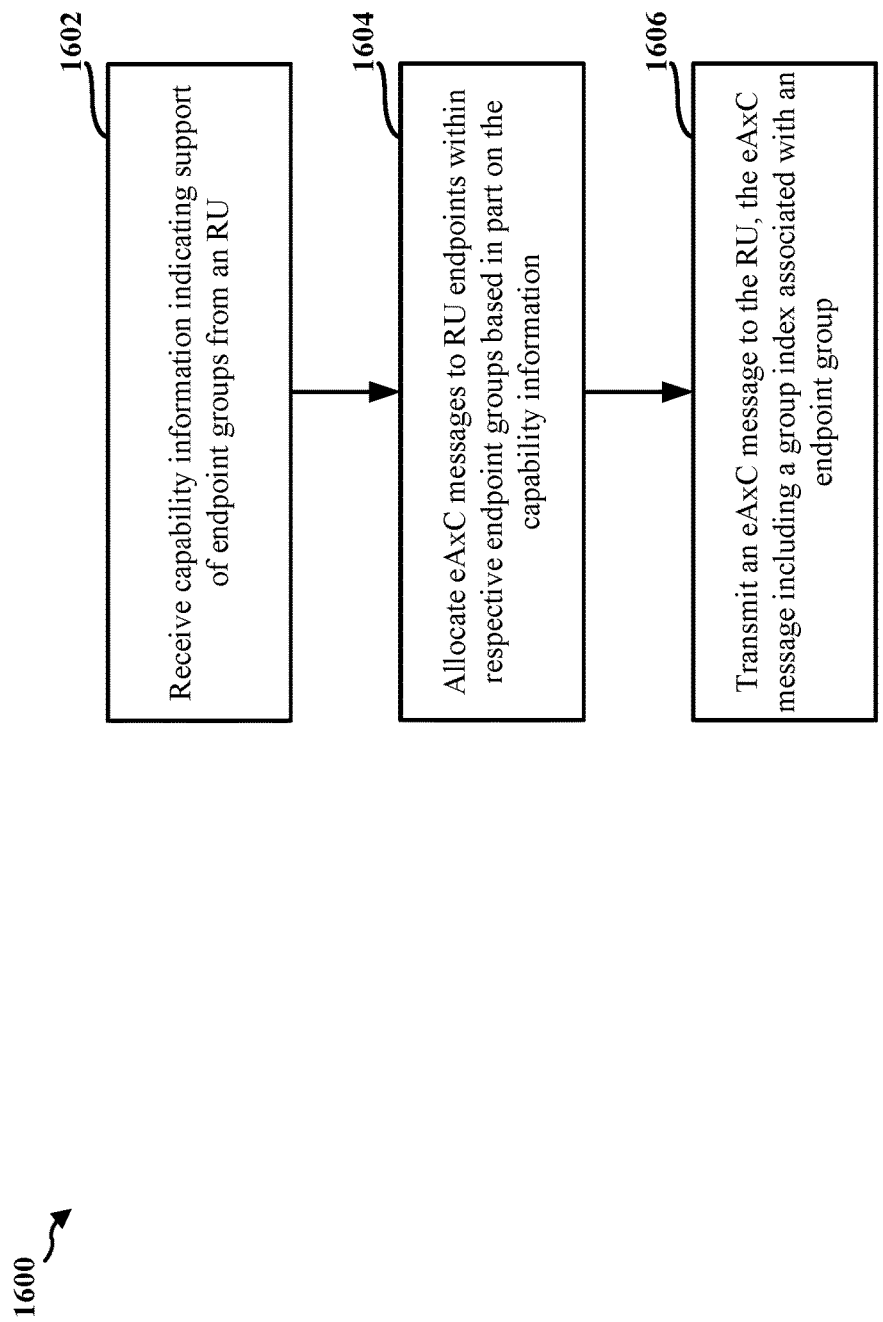
FIG. 16 is a flowchart of a method of wireless communication at a DU, in accordance with the teachings disclosed herein.

FIG. 16 is a flowchart 1600 of a method of wireless communication. The method may be performed by a DU of a base station (e.g., the DU 180A, the DU 804, and/or an apparatus 1802 of FIG. 18). The method may facilitate simplified switching at the RU based on an eAxC allocation policy. In some examples, the DU may facilitate communication in an O-RAN.

At 1602, the DU receives capability information indicating support of endpoint groups from an RU, as described in connection with the capability information 810 of FIG. 8. For example, 1602 may be performed by a capability component 1840 of the apparatus 1802 of FIG. 18. In some examples, the capability information may indicate a quantity of endpoint groups and a respective set of endpoints associated with each endpoint group. For example, the capability information may indicate that there are 50 endpoints associated with a first group, 25 endpoints associated with a second group, and 10 endpoints associated with a third group. In some examples, the capability information may indicate which endpoints are associated with which endpoint group (e.g., via a static-low-level-Mx-endpoint parameter).

In some examples, the endpoint groups include a first set of groups for uplink endpoints and a second set of groups for downlink endpoints. For example, the endpoint groups may include an uplink channel group, an SRS group, and a PRACH group associated with the uplink direction. The endpoint groups may include a downlink channel group and an SSB group associated with the downlink direction. However, other examples may include additional or alternative groups associated with a direction.

In some examples, the RU endpoints associated with a group may be associated with a same set of characteristics. For example, uplink endpoints may be associated with a first set of properties and downlink endpoints may be associated with a second set of properties. In some examples, uplink channel endpoints may be associated with a first set of properties, SRS endpoints may be associated with a second set of properties, PRACH endpoints may be associated with a third set of properties, downlink channel endpoints may be associated with a fourth set of properties, and SSB endpoints may be associated with a fifth set of properties.

At 1604, the DU allocates eAxC messages to RU endpoints within respective endpoint groups baes in part on the capability information, as described in connection with 820 of FIG. 8. For example, 1604 may be performed by an allocation component 1842 of the apparatus 1802 of FIG. 18. For example, the DU may allocate group indices based on the quantity of groups indicated by the capability information. The DU may also allocate group layers/streams within a group based on the quantity of endpoints indicated by the capability information.

At 1606, the DU transmits an eAxC message to the RU, the eAxC message including the group index associated with an endpoint group, as described in connection with the eAxC message 850 of FIG. 8. For example, 1606 may be performed by a message component 1850 of the apparatus 1802 of FIG. 18.

The eAxC message may include an M-plane message, a C-plane message, or an S-plane message including an eAxC. For example, the eAxC may include a DU port identifier, a band sector identifier, a CC identifier, and an RU port identifier, as described in connection with the eAxC identifier 400 of FIG. 4. The RU port identifier may be encoded to include a group index and a per-group layer/stream index, as described in connection with the RU port identifier 610 of FIG. 6 and/or the RU port identifier 710 of FIG. 7. The group index and the per-group layer/stream index may be based on the capability information.

Figure 17:
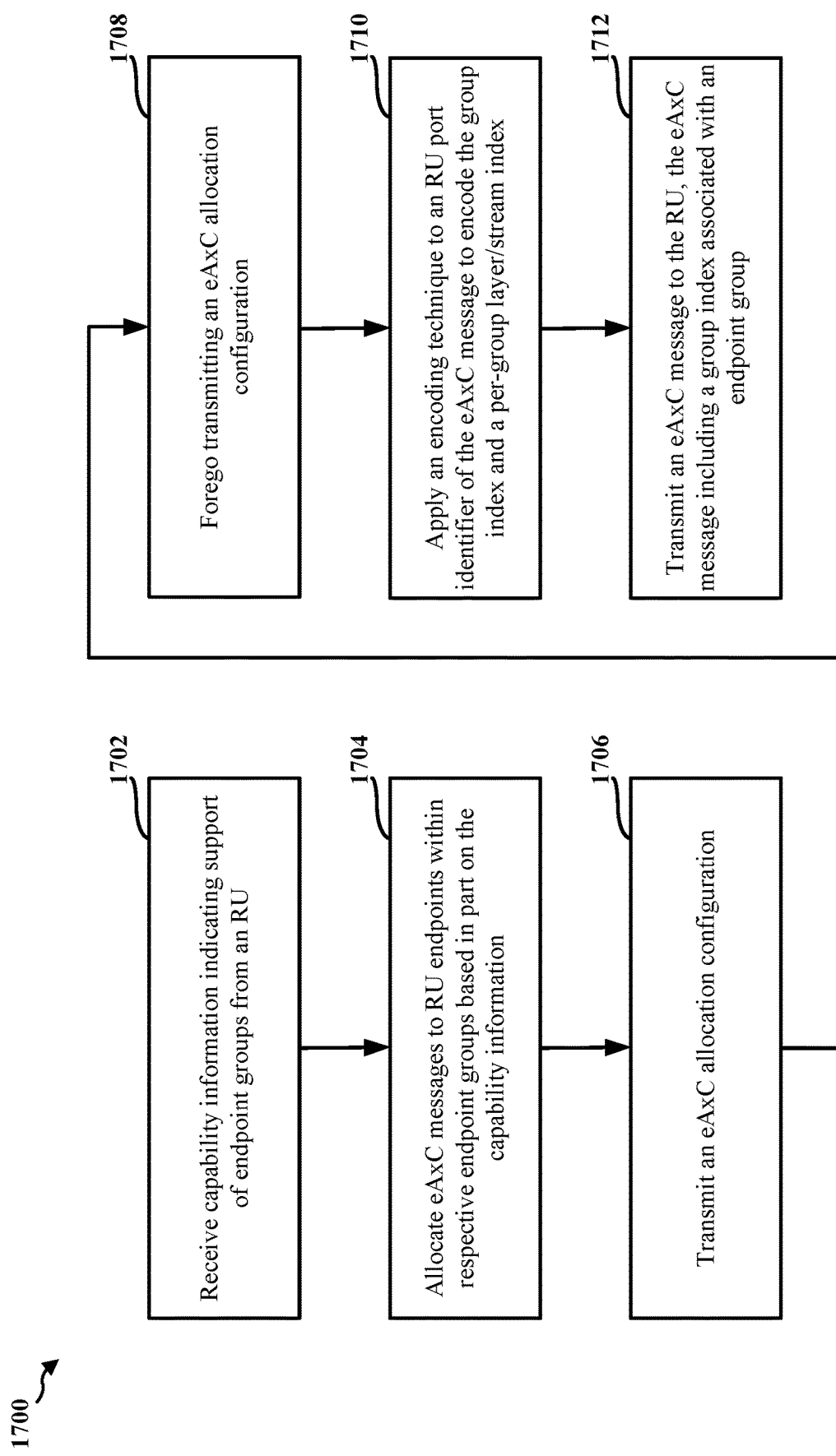
FIG. 17 is a flowchart of a method of wireless communication at a DU, in accordance with the teachings disclosed herein.

FIG. 17 is a flowchart 1700 of a method of wireless communication. The method may be performed by a DU of a base station (e.g., the DU 180A, the DU 804, and/or an apparatus 1802 of FIG. 18). The method may facilitate simplified switching at the RU based on an eAxC allocation policy. In some examples, the DU may facilitate communication in an O-RAN.

At 1702, the DU receives capability information indicating support of endpoint groups from an RU, as described in connection with the capability information 810 of FIG. 8. For example, 1702 may be performed by a capability component 1840 of the apparatus 1802 of FIG. 18. In some examples, the capability information may indicate a quantity of endpoint groups and a respective set of endpoints associated with each endpoint group. For example, the capability information may indicate that there are 50 endpoints associated with a first group, 25 endpoints associated with a second group, and 10 endpoints associated with a third group. In some examples, the capability information may indicate which endpoints are associated with which endpoint group (e.g., via a static-low-level-Mx-endpoint parameter).

In some examples, the endpoint groups include a first set of groups for uplink endpoints and a second set of groups for downlink endpoints. For example, the endpoint groups may include an uplink channel group, an SRS group, and a PRACH group associated with the uplink direction. The endpoint groups may include a downlink channel group and an SSB group associated with the downlink direction. However, other examples may include additional or alternative groups associated with a direction.

In some examples, the RU endpoints associated with a group may be associated with a same set of characteristics. For example, uplink endpoints may be associated with a first set of properties and downlink endpoints may be associated with a second set of properties. In some examples, uplink channel endpoints may be associated with a first set of properties, SRS endpoints may be associated with a second set of properties, PRACH endpoints may be associated with a third set of properties, downlink channel endpoints may be associated with a fourth set of properties, and SSB endpoints may be associated with a fifth set of properties.

At 1704, the DU allocates eAxC messages to RU endpoints within respective endpoint groups baes in part on the capability information, as described in connection with 820 of FIG. 8. For example, 1704 may be performed by an allocation component 1842 of the apparatus 1802 of FIG. 18. For example, the DU may allocate group indices based on the quantity of groups indicated by the capability information. The DU may also allocate group layers/streams within a group based on the quantity of endpoints indicated by the capability information.

At 1706, the DU may transmit an eAxC allocation configuration to the RU, as described in connection with the eAxC allocation configuration 830 of FIG. 8. For example, 1706 may be performed by a configuration component 1852 of the apparatus 1802 of FIG. 18. The eAxC allocation configuration may indicate whether the DU is applying the first encoding technique or the second encoding technique to the RU port identifiers of an eAxC message. The eAxC allocation configuration may additionally or alternatively indicate a mapping between endpoint groups and endpoints. For example, the eAxC allocation configuration may indicate that a first group index ("00") corresponds to the first group, a second group index ("01") corresponds to the second group, and a third group index ("10") corresponds to the third group. When applying the second encoding technique, the eAxC allocation configuration may indicate that the MSB set to a first value ("1") corresponds to the first group, the first two MSBs set to a second value ("01") corresponds to the second group, and the first three MSBs set to a third value ("001") corresponds to the third group.

At 1708, the DU may forego transmitting the eAxC allocation configuration to the RU. For example, 1708 may be performed by the configuration component 1852 of the apparatus 1802 of FIG. 18.

At 1710, the DU may apply an encoding technique to an RU port identifier of an eAxC message to encode the group index and the per-group layer/stream index, as described in connection with 822 of FIG. 8. For example, 1710 may be performed by an encoding component 1844 of the apparatus 1802 of FIG. 18.

In some examples, the DU may apply a first encoding technique in which dedicated bits are allocated to a group index and to a per-group layer/stream index. For example, the first encoding technique (e.g., dedicated bits for the group index and the per-group layer/stream index) may be used to encode the RU port identifier to include the group index. When the first encoding technique is used to encode the RU port identifier, the DU may encode the group index based on a static size field for the group index. For example, in the example of FIG. 6, the group index 612 may be encoded based on the two MSBs of the RU port identifier 610. The RU port identifier may also include a static size field dedicated to the per-group layer/stream index. For example, in the example of FIG. 6, each group index is associated with a block of 64 group layers/streams based on the six bits dedicated to the per-group layer/stream index 614 of the RU port identifier 610. Based on the static size field dedicated to the per-group layer/stream index, addressing of the per-group layer/stream indexes across the endpoint groups may be linear.

In other examples, the second encoding technique (e.g., a bitmask and a varying per-group layer/stream index size) may be used to encode the RU port identifier to include the group index. When the second encoding technique is used to encode the RU port identifier, the DU may encode the group index based on the location of the first value (e.g., "1") in the MSBs of the RU port identifier. For example, in the example of FIG. 7, a first group index may be indicated when the MSB is set to the first value (e.g., "1"), a second group index may be indicated when the next MSB is set to the first value (e.g., "01"), and a third group index may be indicated when the next MSB is set to the first value (e.g., "001"). When a bitmask is used to indicate the group index, the size of the bits used to indicate the per-group layer/stream index may vary. For example, the size of the per-group layer/stream index may be based on the quantity of bits of the RU port identifier and the quantity of bits used to indicate the group index. For example, in the example of FIG. 7 in which the RU port identifier is seven bits, the size of the per-group layer/stream index varies between four bits and six bits based on the quantity of bits used to indicate the group index.

At 1712, the DU transmits an eAxC message to the RU, the eAxC message including the group index associated with an endpoint group, as described in connection with the eAxC message 850 of FIG. 8. For example, 1712 may be performed by a message component 1850 of the apparatus 1802 of FIG. 18.

The eAxC message may include an M-plane message, a C-plane message, or an S-plane message including an eAxC. For example, the eAxC may include a DU port identifier, a band sector identifier, a CC identifier, and an RU port identifier, as described in connection with the eAxC identifier 400 of FIG. 4. The RU port identifier may be encoded to include a group index and a per-group layer/stream index, as described in connection with the RU port identifier 610 of FIG. 6 and/or the RU port identifier 710 of FIG. 7. The group index and the per-group layer/stream index may be based on the capability information.

Figure 18:
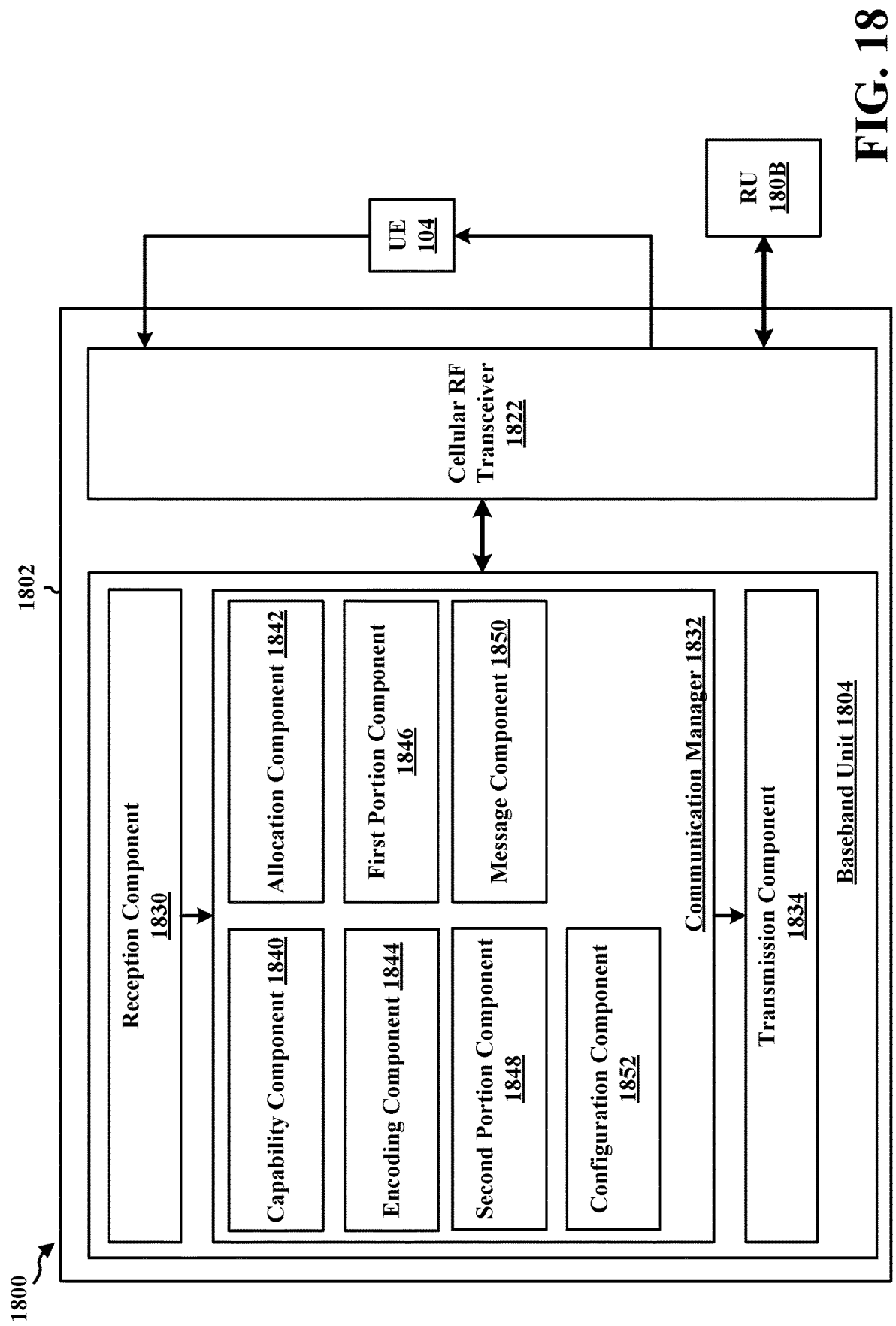
FIG. 18 is a diagram illustrating an example of a hardware implementation for an example apparatus, in accordance with the teachings disclosed herein.

FIG. 18 is a diagram 1800 illustrating an example of a hardware implementation for an apparatus 1802. The apparatus 1802 is a DU of a base station, a component of a base station, or may implement base station functionality. The apparatus 1102 includes a baseband unit 1804. The baseband unit 1804 may communicate through a cellular RF transceiver 1822 with the UE 104 and/or the RU 180B. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the base station 310 and may include the memory 376 and/or at least one of the TX processor 316, the RX processor 370, and the controller/processor 375.

The communication manager 1832 includes a capability component 1840 that is configured to receive, from an RU, capability information indicating support of endpoint groups by the RU, each endpoint group associated with a respective set of RU endpoints, for example, as described in connection with 1402 of FIG. 14 and/or 1502 of FIG. 15. The example capability component 1840 may also be configured to receive capability information indicating support of endpoint groups from an RU, for example, as described in connection with 1602 of FIG. 16 and/or 1702 of FIG. 17.

The communication manager 1832 also includes an allocation component 1842 that is configured to allocate the eAxC message to the RU endpoint of the endpoint group based on a set of characteristics associated with the eAxC message, for example, as described in connection with 1504 of FIG. 15. The example allocation component 1842 may also be configured to allocate eAxC messages to RU endpoints within respective endpoint groups based in part on the capability information, for example, as described in connection with 1604 of FIG. 16 and/or 1704 of FIG. 17.

The communication manager 1832 also includes an encoding component 1844 that is configured to apply an encoding technique to an RU port identifier of the eAxC message to encode the group index and a per-group layer/stream index, for example, as described in connection with 1506 of FIG. 15 and/or 1710 of FIG. 17.

The communication manager 1832 also includes a first portion component 1846 that is configured to encode, based on the capability information, an endpoint group associated with an eAxC message using a first portion of an RU port identifier, the eAxC message including a DU port identifier, a band sector identifier, a component carrier identifier, and the RU port identifier, for example, as described in connection with 1404 of FIG. 14 and/or 1508 of FIG. 15.

The communication manager 1832 also includes a second portion component 1848 that is configured to encode an RU endpoint of the endpoint group using a second portion of the RU port identifier, for example, as described in connection with 1406 of FIG. 14 and/or 1510 of FIG. 15.

The communication manager 1832 also includes a message component 1850 that is configured to transmit the eAxC message to the RU, for example, as described in connection with 1408 of FIG. 14 and/or 1512 of FIG. 15. The example message component 1850 may also be configured to transmit an eAxC message to the RU, the eAxC message including a group index associated with an endpoint group, for example, as described in connection with 1606 of FIG. 16 and/or 1712 of FIG. 17.

The communication manager 1832 also includes a configuration component 1852 that is configured to transmit an eAxC allocation configuration, for example, as described in connection with 1706 of FIG. 17. The example configuration component 1852 may also be configured to forego transmitting an eAxC allocation configuration, for example, as described in connection with 1708 of FIG. 17.

The apparatus may include additional components that perform each of the blocks of the algorithm in the flowcharts of FIGS. 14, 15, 16, and/or 17. As such, each block in the flowcharts of FIGS. 14, 15, 16, and/or 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband unit 1804, includes means for receiving, from an RU, capability information indicating support of endpoint groups by the RU, each endpoint group associated with a respective set of RU endpoints. The example apparatus 1802 also includes means for encoding, based on the capability information, an endpoint group associated with an eAxC message using a first portion of an RU port identifier, the eAxC message including a DU port identifier, a band sector identifier, a component carrier identifier, and the RU port identifier. The example apparatus 1802 also includes means for encoding an RU endpoint of the endpoint group using a second portion of the RU port identifier. The example apparatus 1802 also includes means for transmitting the eAxC message to the RU.

In another configuration, the example apparatus 1802 also includes means for allocating the eAxC message to the RU endpoint of the endpoint group based on a set of characteristics associated with the eAxC message.

In another configuration, the example apparatus 1802 also includes means for encoding the endpoint group using the first portion of the RU port identifier is based on a static bit width. The example apparatus 1802 also includes means for encoding the RU endpoint using the second portion of the RU port identifier is based on linear addressing of RU endpoints across the endpoint groups.

In another configuration, the example apparatus 1802 also includes means for encoding the endpoint group using the first portion of the RU port identifier is based on a bitmask with a bit width corresponding to the endpoint group. The example apparatus 1802 also includes means for encoding the RU endpoint using the second portion of the RU port identifier is based on an RU port identifier bit width and the bit width of the bitmask.

In another configuration, the example apparatus 1802 also includes means for facilitating hierarchical addressing of RU endpoints of the RU.

In another configuration, the example apparatus 1802 includes means for receiving, from an RU, capability information indicating support of endpoint groups by the RU, each endpoint group associated with a respective set of RU endpoints. The example apparatus 1802 also includes means for allocating eAxC messages to RU endpoints within respective endpoint groups based in part on the capability information. The example apparatus 1802 also includes means for transmitting an eAxC message to the RU, the eAxC message including a group index associated with an endpoint group.

In another configuration, the example apparatus 1802 also includes means for applying an encoding technique to an RU port identifier of the eAxC message to encode the group index and a per-group layer/stream index.

In another configuration, the example apparatus 1802 also includes means for transmitting an eAxC allocation configuration to the RU.

In another configuration, the example apparatus 1802 also includes means for foregoing transmitting an eAxC allocation configuration to the RU.

The means may be one or more of the components of the apparatus 1802 configured to perform the functions recited by the means. As described supra, the apparatus 1802 may include the TX processor 316, the RX processor 370, and the controller/processor 375. As such, in one configuration, the means may be the TX processor 316, the RX processor 370, and the controller/processor 375 configured to perform the functions recited by the means.

Aspects disclosed herein configure an RU to receive an eAxC message and to perform switching based on the RU port identifier of the eAxC message. For example, a DU may encode the RU port identifier to indicate a group index via a first portion of the RU port identifier and to indicate a per-group layer/stream index via a second portion of the RU port identifier. The group index may indicate an endpoint group (e.g., the uplink channel group, the SRS group, or the PRACH group in the uplink direction, and the downlink channel group or the SRS group in the downlink direction) and the per-group layer/stream index may indicate the RU endpoint. The RU may decode the RU port identifier to determine the endpoint group and the group layer/stream, and then route the eAxC message to the correct hardware component for processing based on the group index. By using the first portion and the second portion of the RU port identifier to index the eAxC message, aspects disclosed herein facilitate hierarchical addressing of RU endpoints of the RU.

Additionally, aspects disclosed herein configure the RU to receive an eAxC message and to perform switching based on the RU port identifier of the eAxC message. For example, the DU may encode the RU port identifier to include a group index and a per-group layer/stream index. The group index may indicate an endpoint group and the per-group layer/stream index may indicate the RU endpoint. The RU may decode the group index and then route the eAxC message to the correct hardware component for processing based on the group index.

The aspects presented herein may enable improving RU ingress routing, for example, by simplifying switching based on an eAxC allocation policy and/or reducing costs associated with lookup table sizes and lookup table processing.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication RAN RU including at least one processor coupled to a memory and configured to transmit, to a DU, capability information indicating support of endpoint groups, each endpoint group associated with a respective set of RU endpoints; receive an eAxC message from the DU based on the capability information, the eAxC message including a DU port identifier, a band sector identifier, a component carrier identifier, and an RU port identifier; use a first portion of the RU port identifier to identify an endpoint group, the respective set of RU endpoints of the endpoint group associated with a set of characteristics; and use a second portion of the RU port identifier to index the eAxC message to an RU endpoint of the endpoint group.

Aspect 2 is the apparatus of aspect 1, further including that the memory and the at least one processor are further configured to route the eAxC message to a processing component based on the RU endpoint of the endpoint group, the processing component configured to process eAxC messages associated with the set of characteristics.

Aspect 3 is the apparatus of any of aspects 1 and 2, further including that the endpoint groups include one or more of a first set of groups for uplink endpoints, and a second set of groups for downlink endpoints.

Aspect 4 is the apparatus of any of aspects 1 to 3, further including that the first portion of the RU port identifier corresponds to a group index and the second portion of the RU port identifier corresponds to a per-group layer/stream index.

Aspect 5 is the apparatus of any of aspects 1 to 4, further including that the capability information indicates a quantity of endpoint groups, and a quantity of RU endpoints associated with respective endpoint groups.

Aspect 6 is the apparatus of any of aspects 1 to 5, further including that the memory and at least one processor are further configured to sample a quantity of received eAxC messages to determine an encoding technique associated with respective RU port identifiers of the received eAxC messages, the encoding technique used to encode the first portion and the second portion of the respective RU port identifiers; decode the first portion of the RU port identifier based on the encoding technique; and decode the second portion of the RU port identifier based on the encoding technique.

Aspect 7 is the apparatus of any of aspects 1 to 6, further including that decoding the first portion of the RU port identifier is based on a static bit width, and decoding the second portion of the RU port identifier is based on linear addressing of RU endpoints across the endpoint groups Aspect 8 is the apparatus of any of aspects 1 to 6, further including that decoding the first portion of the RU port identifier is based on a bitmask with a bit width corresponding to the endpoint group, and decoding the second portion of the RU port identifier is based on an RU port identifier bit width and the bit width of the bitmask Aspect 9 is the apparatus of any of aspects 1 to 8, further including that the first portion and the second portion facilitate hierarchical addressing of RU endpoints of the RU.

Aspect 10 is the apparatus of any of aspects 1 to 9, further including that the set of characteristics are based on one or more of a data layer, a spatial stream, a numerology, and a channel.

Aspect 11 is a method of wireless communication for implementing any of aspects 1 to 10.

Aspect 12 is an apparatus for wireless communication including means for implementing any of aspects 1 to 10.

Aspect 13 is a non-transitory computer-readable storage medium storing computer executable code, where the code, when executed, causes a processor to implement any of aspects 1 to 10.

Aspect 14 is an apparatus for wireless communication at a RAN DU including at least one processor coupled to a memory and configured to receive, from an RU, capability information indicating support of endpoint groups by the RU, each endpoint group associated with a respective set of RU endpoints; encode, based on the capability information, an endpoint group associated with an eAxC message using a first portion of an RU port identifier, the eAxC message including a DU port identifier, a band sector identifier, a component carrier identifier, and the RU port identifier; encode an RU endpoint of the endpoint group using a second portion of the RU port identifier; and transmit the eAxC message to the RU.

Aspect 15 is the apparatus of aspect 14, further including that the memory and the at least one processor are further configured to allocate the eAxC message to the RU endpoint of the endpoint group based on a set of characteristics associated with the eAxC message.

Aspect 16 is the apparatus of any of aspects 14 and 15, further including that the set of characteristics are based on one or more of a data layer, a spatial stream, a numerology, and a channel.

Aspect 17 is the apparatus of any of aspects 14 to 16, further including that the endpoint groups include one or more of a first set of groups for uplink endpoints, and a second set of groups for downlink endpoints.

Aspect 18 is the apparatus of any of aspects 14 to 17, further including that the first portion of the RU port identifier corresponds to a group index and the second portion of the RU port identifier corresponds to a per-group layer/stream index.

Aspect 19 is the apparatus of any of aspects 14 to 18, further including that the capability information indicates a quantity of endpoint groups, and a quantity of RU endpoints associated with respective endpoint groups.

Aspect 20 is the apparatus of any of aspects 14 to 19, further including that the encoding the endpoint group using the first portion of the RU port identifier is based on a static bit width, and encoding the RU endpoint using the second portion of the RU port identifier is based on linear addressing of RU endpoints across the endpoint groups Aspect 21 is the apparatus of any of aspects 14 to 19, further including that the encoding the endpoint group using the first portion of the RU port identifier is based on a bitmask with a bit width corresponding to the endpoint group, and encoding the RU endpoint using the second portion of the RU port identifier is based on an RU port identifier bit width and the bit width of the bitmask.

Aspect 22 is the apparatus of any of aspects 14 to 21, further including that the first portion and the second portion facilitate hierarchical addressing of RU endpoints of the RU.

Aspect 23 is a method of wireless communication for implementing any of aspects 14 to 22.

Aspect 24 is an apparatus for wireless communication including means for implementing any of aspects 14 to 22.

Aspect 25 is a non-transitory computer-readable storage medium storing computer executable code, where the code, when executed, causes a processor to implement any of aspects 14 to 22.

Aspect 26 is an apparatus for wireless communication at a RAN RU including at least one processor coupled to a memory and configured to transmit, to a DU, capability information indicating support of endpoint groups, each endpoint group associated with a respective set of RU endpoints; receive an eAxC message from the DU, the eAxC message including a group index based on the capability information; and route the eAxC message to a processing component based in part on the group index included in the eAxC message.

Aspect 27 is the apparatus of aspect 26, further including that the eAxC message includes a DU port identifier, a band sector identifier, a component carrier identifier, and an RU port identifier, the RU port identifier including the group index and a per-group layer/stream index.

Aspect 28 is the apparatus of any of aspects 26 and 27, further including that the endpoint groups include a first set of groups for uplink endpoints and a second set of groups for downlink endpoints.

Aspect 29 is the apparatus of any of aspects 26 to 28, further including that RU endpoints allocated to a same endpoint group are associated with a same set of characteristics.

Aspect 30 is the apparatus of any of aspects 26 to 29, further including that the capability information indicates a quantity of endpoint groups and a quantity of RU endpoints associated with each of the respective endpoint groups.

Aspect 31 is the apparatus of any of aspects 26 to 30, further including that the memory and the at least one processor are further configured to sample a quantity of received eAxC messages to determine an encoding technique associated with RU port identifiers of the received eAxC messages, the encoding technique used to encode the group index and a per-group layer/stream index of the RU port identifiers.

Aspect 32 is the apparatus of any of aspects 26 to 31, further including that the encoding technique includes a static size field for the group index and linear addressing of per-group layer/stream indexes across the endpoint groups.

Aspect 33 is the apparatus of any of aspects 26 to 31, further including that the encoding technique includes a bitmask for the group index and a size of the per-group layer/stream index associated with a respective group index is based on a size of the RU port identifier and a size of the respective bitmask.

Aspect 34 is a method of wireless communication for implementing any of aspects 26 to 33.

Aspect 35 is an apparatus for wireless communication including means for implementing any of aspects 26 to 33.

Aspect 36 is a non-transitory computer-readable storage medium storing computer executable code, where the code, when executed, causes a processor to implement any of aspects 26 to 33.

Aspect 37 is an apparatus for wireless communication at a RAN RU including at least one processor coupled to a memory and configured to receive, from an RU, capability information indicating support of endpoint groups by the RU, each endpoint group associated with a respective set of RU endpoints; allocate eAxC messages to RU endpoints within respective endpoint groups based in part on the capability information; and transmit an eAxC message to the RU, the eAxC message including a group index associated with an endpoint group.

Aspect 38 is the apparatus of aspect 37, further including that the eAxC message includes a DU port identifier, a band sector identifier, a component carrier identifier, and an RU port identifier, the RU port identifier including the group index and a per-group layer/stream index.

Aspect 39 is the apparatus of any of aspects 37 and 38, further including that the endpoint groups include a first set of groups for uplink endpoints and a second set of groups for downlink endpoints.

Aspect 40 is the apparatus of any of aspects 37 to 39, further including that RU endpoints allocated to a same endpoint group are associated with a same set of characteristics.

Aspect 41 is the apparatus of any of aspects 37 to 40, further including that the capability information indicates a quantity of endpoint groups and a quantity of RU endpoints associated with each of the respective endpoint groups.

Aspect 42 is the apparatus of any of aspects 37 to 41, further including that the memory and the at least one processor are further configured to apply an encoding technique to an RU port identifier of the eAxC message to encode the group index and a per-group layer/stream index.

Aspect 43 is the apparatus of any of aspects 37 to 42, further including that the encoding technique includes a static size field for the group index and linear addressing of per-group layer/stream indexes across the endpoint groups.

Aspect 44 is the apparatus of any of aspects 37 to 42, further including that the encoding technique includes a bitmask for the group index and a size of the per-group layer/stream index associated with a respective group index is based on a size of the RU port identifier and a size of the respective bitmask.

Aspect 45 is a method of wireless communication for implementing any of aspects 37 to 44.

Aspect 46 is an apparatus for wireless communication including means for implementing any of aspects 37 to 44.

Aspect 47 is a non-transitory computer-readable storage medium storing computer executable code, where the code, when executed, causes a processor to implement any of aspects 37 to 44.

What is claimed is:
1. An apparatus for wireless communication at a radio access network (RAN) radio unit (RU), comprising:
   a memory; and
   at least one processor coupled to the memory and configured to:
      transmit, to a distributed unit (DU), capability information indicating support of endpoint groups, each endpoint group associated with a respective set of RU endpoints;
      receive an extended Antenna-Carrier (eAxC) message from the DU based on the capability information, the eAxC message including a DU port identifier, a band sector identifier, a component carrier identifier, and an RU port identifier;
      use a first portion of the RU port identifier to identify an endpoint group, the respective set of RU endpoints of the endpoint group associated with a set of characteristics; and
      use a second portion of the RU port identifier to index the eAxC message to an RU endpoint of the endpoint group.

2. The apparatus of claim 1, wherein the memory and the at least one processor are further configured to:
   route the eAxC message to a processing component based on the RU endpoint of the endpoint group, the processing component configured to process eAxC messages associated with the set of characteristics.

3. The apparatus of claim 1, wherein the endpoint groups include one or more of
a first set of groups for uplink endpoints, and
a second set of groups for downlink endpoints.

4. The apparatus of claim 1, wherein the first portion of the RU port identifier corresponds to a group index and the second portion of the RU port identifier corresponds to a per-group layer/stream index.

5. The apparatus of claim 1, wherein the capability information indicates
a quantity of endpoint groups, and
a quantity of RU endpoints associated with respective endpoint groups.

6. The apparatus of claim 1, wherein the memory and the at least one processor are further configured to:
sample a quantity of received eAxC messages to determine an encoding technique associated with respective RU port identifiers of the received eAxC messages, the encoding technique used to encode the first portion and the second portion of the respective RU port identifiers;
decode the first portion of the RU port identifier based on the encoding technique; and
decode the second portion of the RU port identifier based on the encoding technique.

7. The apparatus of claim 6, wherein the memory and the at least one processor are configured to:
decode the first portion of the RU port identifier based on a static bit width, and
decode the second portion of the RU port identifier based on linear addressing of RU endpoints across the endpoint groups.

8. The apparatus of claim 6, wherein the memory and the at least one processor are configured to:
decode the first portion of the RU port identifier based on a bitmask with a bit width corresponding to the endpoint group, and
decode the second portion of the RU port identifier based on an RU port identifier bit width and the bit width of the bitmask.

9. The apparatus of claim 1, wherein the first portion and the second portion facilitate hierarchical addressing of RU endpoints of the RU.

10. The apparatus of claim 1, wherein the set of characteristics are based on one or more of
a data layer,
a spatial stream,
a numerology, and
a channel.

11. The apparatus of claim 1, further comprising a transceiver coupled to the at least one processor.

12. A method of wireless communication at a radio access network (RAN) radio unit (RU), comprising:
transmitting, to a distributed unit (DU), capability information indicating support of endpoint groups, each endpoint group associated with a respective set of RU endpoints;
receiving an extended Antenna-Carrier (eAxC) message from the DU based on the capability information, the eAxC message including a DU port identifier, a band sector identifier, a component carrier identifier, and an RU port identifier;
using a first portion of the RU port identifier to identify an endpoint group, the respective set of RU endpoints of the endpoint group associated with a set of characteristics; and
using a second portion of the RU port identifier to index the eAxC message to an RU endpoint of the endpoint group.

13. The method of claim 12, further comprising:
routing the eAxC message to a processing component based on the RU endpoint of the endpoint group, the processing component configured to process eAxC messages associated with the set of characteristics.

14. The method of claim 12, further comprising:
sampling a quantity of received eAxC messages to determine an encoding technique associated with respective RU port identifiers of the received eAxC messages, the encoding technique used to encode the first portion and the second portion of the respective RU port identifiers;
decoding the first portion of the RU port identifier based on the encoding technique; and
decoding the second portion of the RU port identifier based on the encoding technique.

15. The method of claim 14, wherein
decoding the first portion of the RU port identifier is based on a static bit width, and
decoding the second portion of the RU port identifier is based on linear addressing of RU endpoints across the endpoint groups.

16. The method of claim 14, wherein
decoding the first portion of the RU port identifier is based on a bitmask with a bit width corresponding to the endpoint group, and
decoding the second portion of the RU port identifier is based on an RU port identifier bit width and the bit width of the bitmask.

17. An apparatus for wireless communication at a radio access network (RAN) distributed unit (DU), comprising:
a memory; and
at least one processor coupled to the memory and configured to:
receive, from a radio unit (RU), capability information indicating support of endpoint groups by the RU, each endpoint group associated with a respective set of RU endpoints;
encode, based on the capability information, an endpoint group associated with an extended Antenna-Carrier (eAxC) message using a first portion of an RU port identifier, the eAxC message including a DU port identifier, a band sector identifier, a component carrier identifier, and the RU port identifier;
encode an RU endpoint of the endpoint group using a second portion of the RU port identifier; and
transmit the eAxC message to the RU.

18. The apparatus of claim 17, wherein the memory and the at least one processor are further configured to:
allocate the eAxC message to the RU endpoint of the endpoint group based on a set of characteristics associated with the eAxC message.

19. The apparatus of claim 18, wherein the set of characteristics are based on one or more of
a data layer,
a spatial stream,
a numerology, and
a channel.

20. The apparatus of claim 17, wherein the endpoint groups include one or more of
a first set of groups for uplink endpoints, and
a second set of groups for downlink endpoints.

21. The apparatus of claim 17, wherein the first portion of the RU port identifier corresponds to a group index and the second portion of the RU port identifier corresponds to a per-group layer/stream index.

22. The apparatus of claim 17, wherein the capability information indicates
a quantity of endpoint groups, and
a quantity of RU endpoints associated with respective endpoint groups.

23. The apparatus of claim 17, wherein the memory and the at least one processor are configured to:
encode the endpoint group using the first portion of the RU port identifier based on a static bit width, and
encode the RU endpoint using the second portion of the RU port identifier based on linear addressing of RU endpoints across the endpoint groups.

24. The apparatus of claim 17, wherein the memory and the at least one processor are configured to:
encode the endpoint group using the first portion of the RU port identifier based on a bitmask with a bit width corresponding to the endpoint group, and
encode the RU endpoint using the second portion of the RU port identifier based on an RU port identifier bit width and the bit width of the bitmask.

25. The apparatus of claim 17, wherein the first portion and the second portion facilitate hierarchical addressing of RU endpoints of the RU.

26. The apparatus of claim 17, further comprising a transceiver coupled to the at least one processor.

27. A method of wireless communication at a radio access network (RAN) distributed unit (DU), comprising:
receiving, from a radio unit (RU), capability information indicating support of endpoint groups by the RU, each endpoint group associated with a respective set of RU endpoints;
encoding, based on the capability information, an endpoint group associated with an extended Antenna-Carrier (eAxC) message using a first portion of an RU port identifier, the eAxC message including a DU port identifier, a band sector identifier, a component carrier identifier, and the RU port identifier;
encoding an RU endpoint of the endpoint group using a second portion of the RU port identifier; and
transmitting the eAxC message to the RU.

28. The method of claim 27, further comprising:
allocating the eAxC message to the RU endpoint of the endpoint group based on a set of characteristics associated with the eAxC message.

29. The method of claim 27, wherein
encoding the endpoint group using the first portion of the RU port identifier is based on a static bit width, and
encoding the RU endpoint using the second portion of the RU port identifier is based on linear addressing of RU endpoints across the endpoint groups.

30. The method of claim 27, wherein
encoding the endpoint group using the first portion of the RU port identifier is based on a bitmask with a bit width corresponding to the endpoint group, and
encoding the RU endpoint using the second portion of the RU port identifier is based on an RU port identifier bit width and the bit width of the bitmask.

\* \* \* \* \*